United States Patent
Pueschel et al.

(10) Patent No.: US 8,321,823 B2
(45) Date of Patent: Nov. 27, 2012

(54) SYSTEM AND METHOD FOR DESIGNING ARCHITECTURE FOR SPECIFIED PERMUTATION AND DATAPATH CIRCUITS FOR PERMUTATION

(75) Inventors: Markus Pueschel, Pittsburgh, PA (US); Peter A. Milder, Pittsburgh, PA (US); James C. Hoe, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 1091 days.

(21) Appl. No.: 12/244,277

(22) Filed: Oct. 2, 2008

(65) Prior Publication Data

US 2009/0094578 A1 Apr. 9, 2009

Related U.S. Application Data

(60) Provisional application No. 60/997,596, filed on Oct. 4, 2007.

(51) Int. Cl.
G06F 17/50 (2006.01)

(52) U.S. Cl. .................................. 716/104; 716/101

(58) Field of Classification Search ........... 716/100–104
See application file for complete search history.

(56) References Cited

U.S. PATENT DOCUMENTS

| | | | |
|---|---|---|---|
| 5,163,017 A | 11/1992 | Wong et al. | |
| 5,594,657 A | 1/1997 | Cantone et al. | |
| 5,808,942 A | 9/1998 | Sharpe-Geisler | |
| 6,304,887 B1 | 10/2001 | Ju et al. | |
| 6,389,379 B1* | 5/2002 | Lin et al. | 703/14 |
| 6,549,925 B1 | 4/2003 | Amrany et al. | |
| 7,010,558 B2 | 3/2006 | Morris | |
| 7,023,938 B1 | 4/2006 | Kapoor et al. | |
| 7,062,744 B2 | 6/2006 | Osann, Jr. | |
| 7,237,055 B1 | 6/2007 | Rupp | |
| 2003/0121010 A1* | 6/2003 | Aubury | 716/4 |
| 2003/0140337 A1* | 7/2003 | Aubury | 717/158 |
| 2007/0250656 A1 | 10/2007 | Rupp | |

OTHER PUBLICATIONS

Puschel, Markus and Martin Rotteler, "Algebraic Signal Processing Theory: Cooley-Tukey Type Algorithms on the 2-D Hexagonal Spatial Lattice", AAECC Manuscript, pp. 1-32.
Alberto et al., "Generating FPGA-Accelerated DFT Libraries", 12 pages.
Milder et al., "Formal Datapath Representation and Manipulation for Implementing DSP Transforms", DAC 2008, Jun. 8-13, 2008, Anaheim, California, USA, 6 pages.
Voronenko, Yevgen and Markus Puschel, "Algebraic Signal Processing Theory: Cooley-Tukey Type Algorithms for Real DFTs", Transactions on Signal Processing, vol. X, No. X, Nov. 200X, 17 pages.

* cited by examiner

Primary Examiner — Jack Chiang
Assistant Examiner — Binh Tat
(74) Attorney, Agent, or Firm — K&L Gates LLP

(57) ABSTRACT

Computer-implemented systems and methods that provide an efficient technique for performing a large class of permutations on data vectors of length $2^n$, n>1, implemented with streaming width $2^k$ (where $1 \leq k \leq n-1$). The technique applies to any permutation Q on $2^n$ datawords that can be specified as a linear transform, i.e., as an n×n bit matrix (a matrix containing only 1s and 0s) P on the bit level. The relationship between Q and P is as follows: If Q maps (dataword) i to (dataword) j, then the bit representation of j is the bit-matrix-vector product of P with the bit representation of i. Given such a permutation specified by the matrix P and given the streaming width (k), an architectural framework (or datapath) is calculated to implement the permutation.

23 Claims, 10 Drawing Sheets

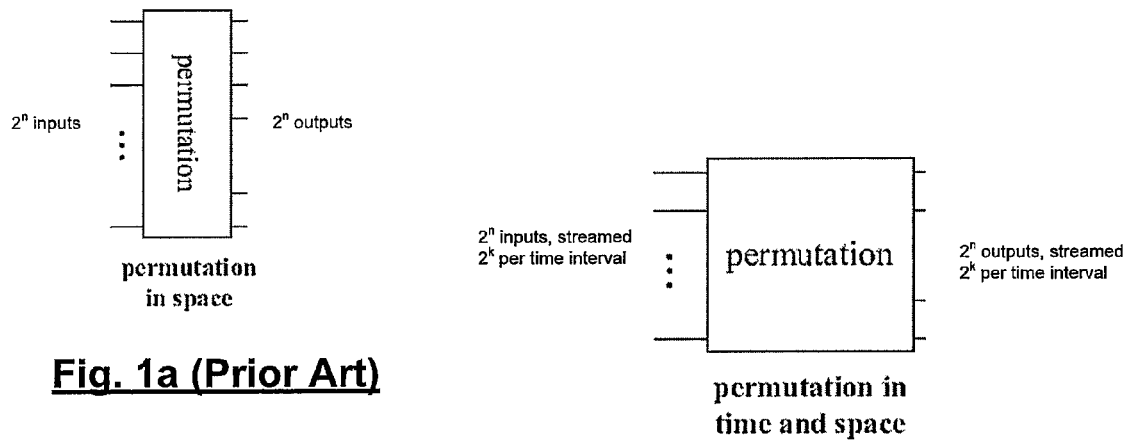
Fig. 1a (Prior Art)
Fig. 1b
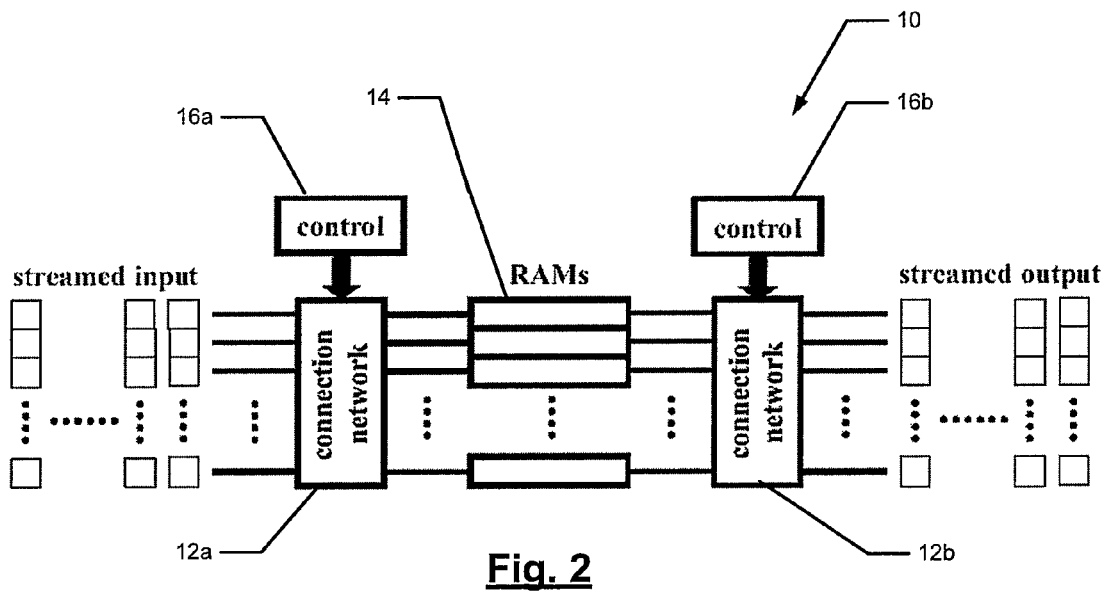
Fig. 2

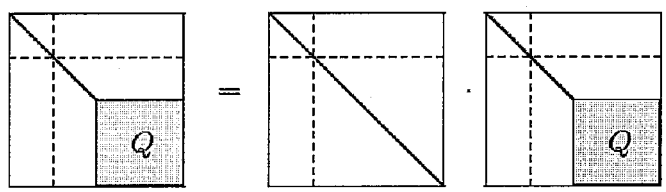
Fig. 15
Fig. 16
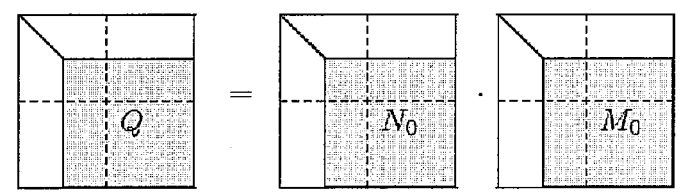
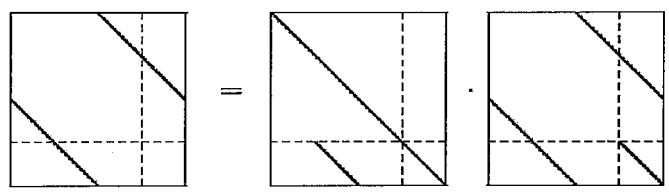
Fig. 17
Fig. 18
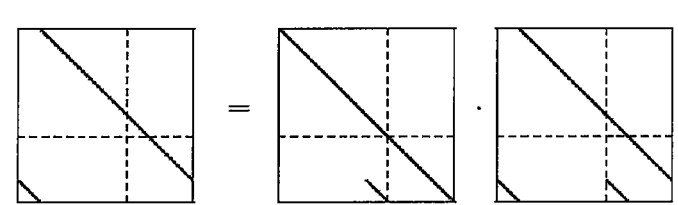

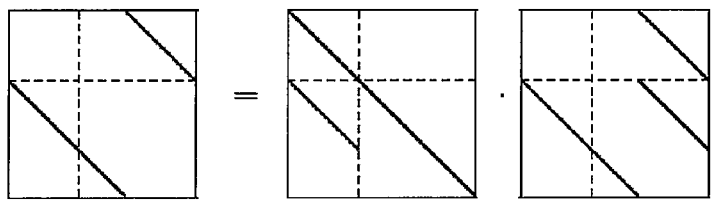
Fig. 19
Fig. 20
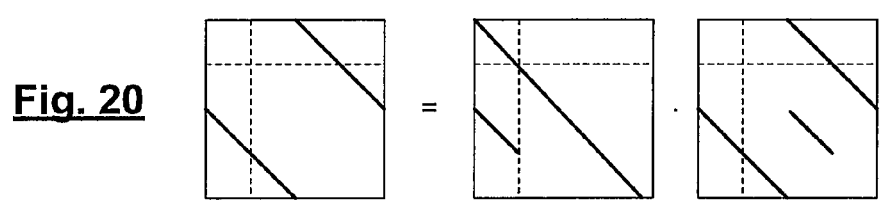
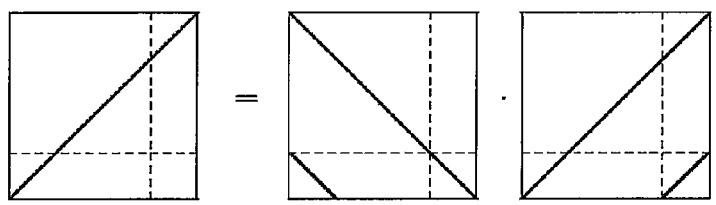
Fig. 21
Fig. 22
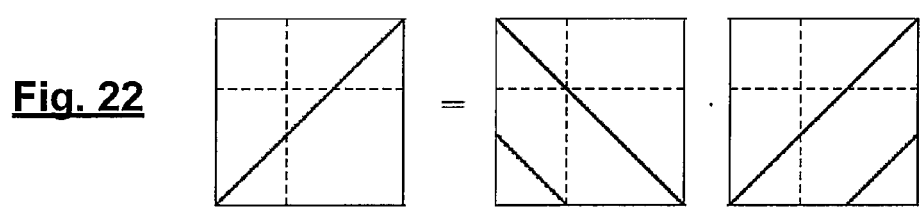

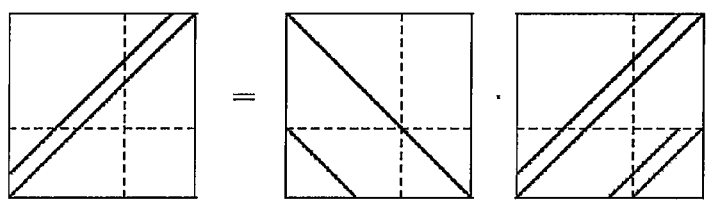
Fig. 23
Fig. 24
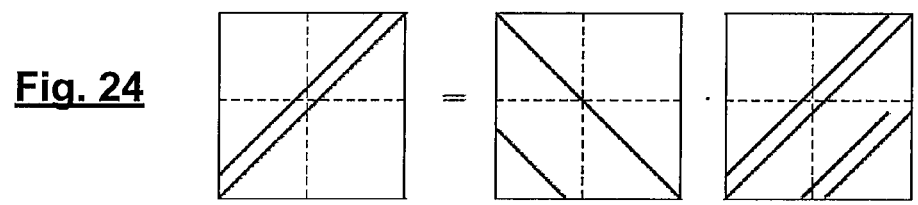
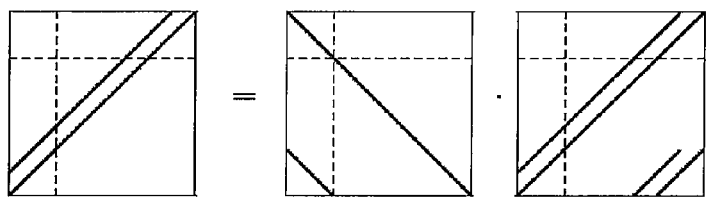
Fig. 25

US 8,321,823 B2

SYSTEM AND METHOD FOR DESIGNING ARCHITECTURE FOR SPECIFIED PERMUTATION AND DATAPATH CIRCUITS FOR PERMUTATION

PRIORITY CLAIM

The present application claims priority to U.S. provisional application Ser. No. 60/997,596, filed Oct. 4, 2007, entitled "Streaming Data Permutation Datapath Using Memory Arrays," which is incorporated herein by reference in its entirety.

STATEMENT REGARDING FEDERALLY SPONSORED RESEARCH OR DEVELOPMENT

This invention was made with support from the U.S. government, under National Science Foundation No. ITR/ACI-0325687, and Defense Advanced Research Program No. NBCH-1050009. The U.S. government has certain rights in this invention.

BACKGROUND

Many applications that are implemented in hardware take as input a list or vector of data words and produce a vector of data words of the same length as output. These applications are often implemented using streaming architectures. In these architectures, the input vector is divided into chunks of equal length and these chunks enter the architecture at regular intervals. Similarly, the output is produced in chunks exiting the architecture in regular intervals. Streaming means that the architectures can start processing the first chunk of the next input vector immediately after the last chunk of the current data vector entered. This present invention is concerned with the design of streaming architectures for permutations of a data vector. A permutation is a fixed reordering in a predetermined manner.

FIG. 1$a$ shows a permutation in space. All $2^n$ datawords are available in one time interval and can hence be permuted using only wires (the wires are not shown).

SUMMARY

The present invention is concerned generally with designing streaming architectures for permutation in the scenario shown in FIG. 1$b$. In this figure, the $2^n$ datawords are input in chunks of size $2^k$ and over $2^{n-k}$ time intervals. The output is produced accordingly. Now the permutation is across space and time and, in general, cannot be implemented using solely wires.

In one general aspect, the present invention is directed to computer-implemented systems and methods that provide an efficient technique for performing a large class of permutations on data vectors of length $2^n$, n>1, implemented with streaming width $2^k$ (where $1 \leq k \leq n-1$). The technique applies to any permutation Q on $2^n$ datawords that can be specified as a linear transform, i.e., as an n×n bit matrix (a matrix containing only 1s and 0s) P on the bit level. The relationship between Q and P is as follows: If Q maps (dataword) i to (dataword) j, then the bit representation of j is the bit-matrix-vector product of P with the bit representation of i. Bit-matrix-vector product means that the operations are over the finite field with two elements (often called GF(2)) 0 and 1, addition being XOR and multiplication being AND.

Given such a permutation specified by the matrix P and given the streaming width (k), an architectural framework (or datapath) is calculated to implement the permutation. In various embodiments, the datapath comprises: (i) a number of memory banks that are capable, during one time interval, of reading a data word and writing a data word; (ii) a write-stage connection network that takes in each time interval as input the chunks of the input vector and writes the contained data words to the memory banks according to a matrix M as explained below; and (iii) a read-stage connection network that reads in each time interval data words from the memory banks according to the matrix N as explained below and outputs them in chunks. N and M are such that P=NM (again, this matrix-matrix product is over the finite field with two elements) and rank($M_1$)=rank($N_1'$)=k, wherein $M_1$ is a submatrix of M and $N_1'$ is a submatrix of $N^{-1}$. The details are described below.

In various embodiments, the computed solution always produces a partially optimal solution; that is, one of the stages (i.e., the write-stage or the read-stage) is optimal defined in terms of connectivity and control cost. Furthermore, in cases where the bit matrix P is a permutation matrix (i.e., a matrix having exactly one "1" in each row and in each column, with zeros elsewhere), both stages are optimal in terms of connectivity and control cost.

Various embodiments of the present invention are directed to a computer-implemented system and methods for computing the datapath, and, in other embodiments, to various classes of datapaths themselves.

FIGURES

Various embodiments of the present invention are described herein by way of example in conjunction with the following figures, wherein:

FIG. 1$a$ is a diagram of a prior art permutation datapath that receives $2^n$ inputs at once;

FIG. 1$b$ is a diagram of a permutation datapath according to various embodiments of the present invention that receives streaming input data;

FIG. 2 is a diagram of a datapath according to various embodiments of the present invention; FIG. 2 shows the details of FIG. 1$b$;

FIG. 4($b$) is a diagram illustrating the indexing of the memory banks with addresses according to various embodiments of the present invention;

Figure 9:
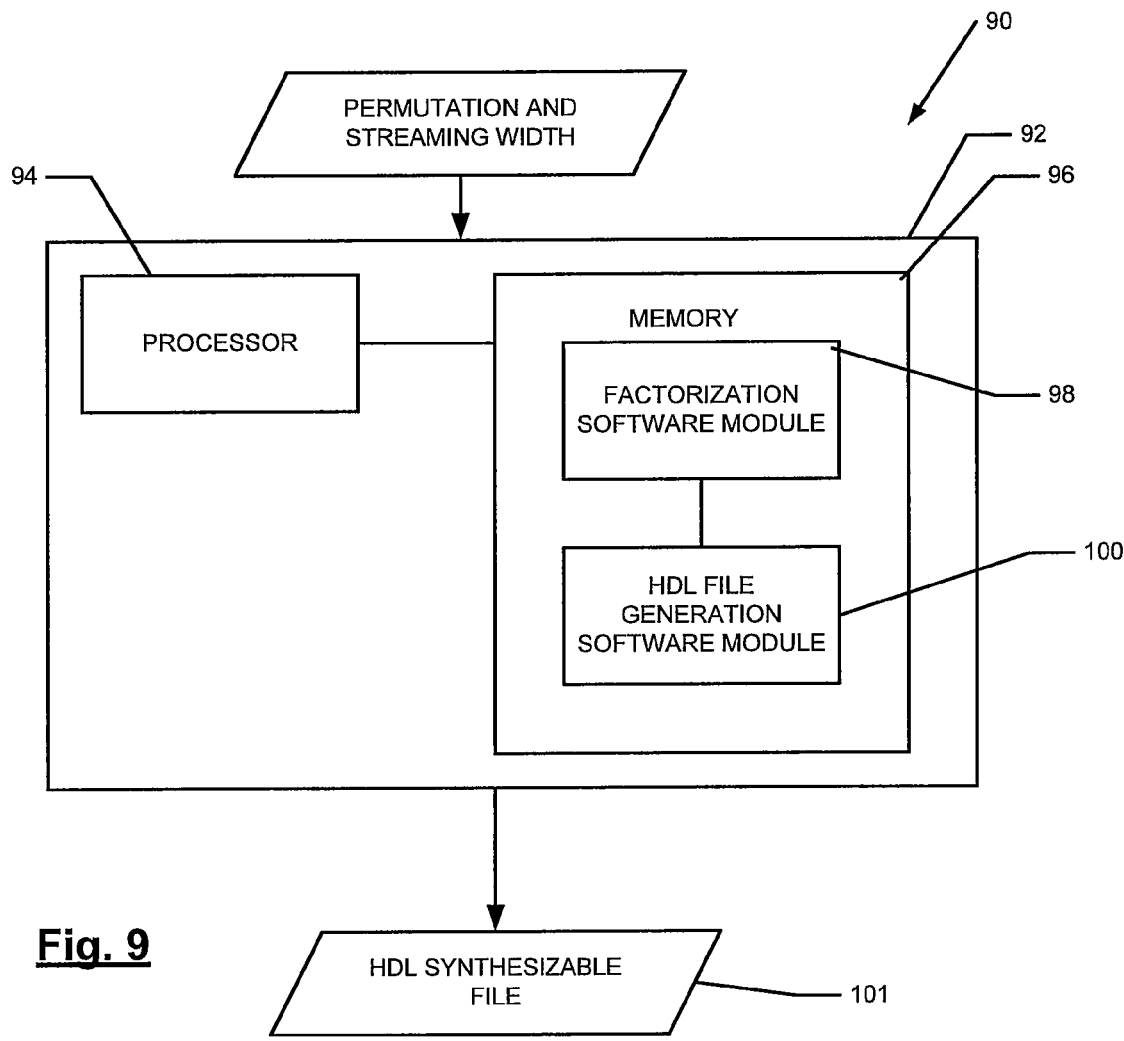
Figure 10:
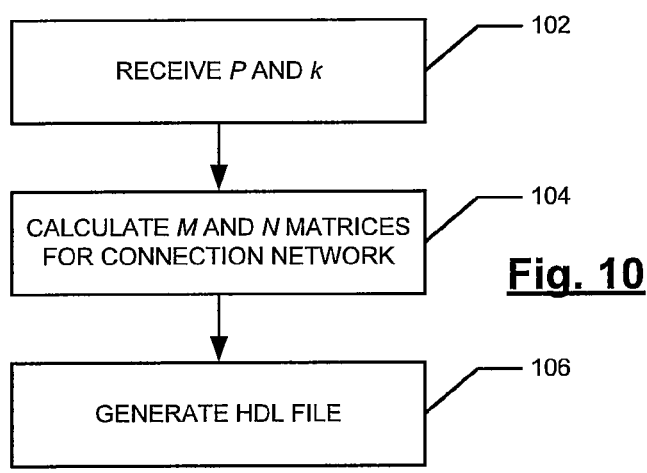

FIGS. 7$a$ and 7$b$ are diagrams of the processes according to various embodiments of the present invention;

FIG. 9 is a diagram of a computer system according to various embodiments of the present invention;

FIG. 10 is a diagram of a computer-implemented process according to various embodiments of the present invention; and FIGS. 11 to 25 illustrate forms of matrices according to various embodiments of the present invention.

DESCRIPTION

According to various embodiments, the present invention is directed to computer-implemented systems and methods that compute a datapath architecture for performing certain types of specified permutations. The architecture, with reference to FIG. 1b, utilizes streaming data of width $2^k$ (where $1 \leq k \leq n$) data words per cycle. Accordingly, $2^k$ inputs stream into the system each cycle, over a total of $2^{n-k}$ cycles. When the streaming data are permuted, they must be reordered in space (via wires and switches) and across time boundaries (by storing and retrieving data from memory). Using streaming data allows datapath reuse to be exploited by building fewer of the identical computation blocks and reusing them over several cycles.

The process works on a large class of permutations, that is, any permutation that can be specified as a linear transform or matrix-vector multiplication with a matrix P on the bit level as defined in [0015]. In addition, the solution is optimal in terms of connectivity and cost for a subset of this class, namely permutations for which said matrix P is a permutation matrix, that is, it has exactly one (1) in each row and exactly one (1) in each column, with zeros elsewhere. This class of permutations includes stride permutations, which are a widely used type of permutation, especially in applications utilizing fast Fourier transforms and other transforms.

Initially, some background on permutations may be helpful. Consider a permutation on $2^n$ points $0, \ldots, 2^n-1$. For example, the cyclic shift is defined by:

$$\vec{C}_{2^n}: 0 \mapsto 1 \mapsto 2 \mapsto \ldots \mapsto 2^n-1 \mapsto 0.$$

Permutations also may be viewed as matrices. There are two choices for associating a matrix with a permutation and they are transposes of each other. In one embodiment, the one that makes $$\vec{C}_{2^n} = \begin{pmatrix} 0 & 1 & & & \\ & & \ddots & & \\ & & & \ddots & \\ & & & & 1 \\ 1 & & & & 0 \end{pmatrix} \quad (1)$$

is chosen. The set of all permutations on $2^n$ points is denoted with $S_{2^n}$ and is a group, called the symmetric group. It has $2^n!$ elements. A field (also called Galois field) may be denoted with 2 elements with $F_2 = \{0, 1\}$, where its elements may be considered the two states of a bit. Addition and multiplication in $F_2$ may be equivalent to the "xor" and "and" operations, respectively.

Permutations on $0, \ldots, 2^n-1$ can equivalently be seen as permutations on the corresponding bit representations $x \in F_2^n$ of these numbers. These x may be viewed as column vectors and the least significant bit may be assumed to be on the bottom. For example, for n=2, 1 is represented as $$\begin{pmatrix} 0 \\ 1 \end{pmatrix}.$$

In some cases the permutations of $F_2^n$ correspond to linear mappings on $F_2^n$ of the form, $$\delta = Px, P \in GL_n(F_2)$$

where $GL_n(F_2)$ is the group of all invertible n×n bit matrices. Its size is $(2^n-1)(2^n-2)\ldots(2^n-2^{n-1})$. Every bit matrix $P \in GL_n(F_2)$ defies a permutation in $S_{2^n}$, which may be captured by the mapping:

$$\pi: GL_n(F_2) \to S_{2^n}, P \mapsto \pi(P). \quad (2)$$

$GL_n(F_2)$ may be identified with its image $\pi(GL_n(F_2))$ in $S_{2^n}$.

Consider an example where $$P = \begin{pmatrix} 1 & 1 \\ & 1 \end{pmatrix}$$

maps $\begin{pmatrix} 0 \\ 0 \end{pmatrix} \mapsto \begin{pmatrix} 0 \\ 0 \end{pmatrix}, \begin{pmatrix} 0 \\ 1 \end{pmatrix} \mapsto \begin{pmatrix} 1 \\ 1 \end{pmatrix}, \begin{pmatrix} 1 \\ 0 \end{pmatrix} \mapsto \begin{pmatrix} 0 \\ 1 \end{pmatrix}, \begin{pmatrix} 1 \\ 1 \end{pmatrix} \mapsto \begin{pmatrix} 0 \\ 1 \end{pmatrix},$ i.e., $0 \mapsto 0, 1 \mapsto 3, 2$, which implies:

$$\pi(P) = \begin{pmatrix} 1 & & & \\ & & & 1 \\ & & 1 & \\ & 1 & & \end{pmatrix}.$$

To clearly distinguish matrices P that operate on n bits from permutation matrices that operate on $2^n$ points, the latter is marked with a $\to$.

In addition, the "direct sum" and the Kronecker or "tensor product" of matrices P, Q respectively may be denoted:

$$P \oplus Q = \begin{pmatrix} P & \\ & Q \end{pmatrix}, \text{ and } P \otimes Q = (p_{i,j}Q)_{i,j} \text{ for } P = (p_{i,j}).$$

Further, $I_n$ may be the n×n identity matrix and $J_n$ is $I_n$ with the columns in reversed order. The stride permutation may be defined via:

$$\vec{L}_{2^n, 2^s}: i2^{n-s}+j \mapsto j2^s+i,\ 0 \leq i \leq 2^s, 0 \leq j \leq 2^{n-s}$$

Equivalently, $\vec{L}_{2^n, 2^s}$ transposes a $2^{n-s} \times 2^s$ array stored in row-major order. $\vec{L}_{2^n, 2^{n-1}}$ is also called the perfect shuffle. In addition, the bit-reversal permutation may be denoted $\vec{R}_{2^n}$.

With this notation, the following properties of π in equation (2) above can now be stated. If $P_1 Q \in GL_n(F_2)$, then the following holds:

$$\pi(PQ) = \pi(P)\pi(Q) \text{ and } \pi(P^{-1}) = \pi(P)^{-1} \text{ (i.e., } \pi \text{ is a group homomorphism)} \quad (1)$$

$$\pi(P \oplus Q) = P \otimes Q \quad (2)$$

$$\pi(I_n) = \vec{I}_{2^n} \quad (3)$$

$$\pi(C_n^k) = \vec{L}_{2^n, 2^k} \quad (4)$$

$$\pi(J_n) = \vec{R}_{2^n} \quad (5)$$

Based on linear algebra, if $P \in F_2^{m \times n}$ is a m×n bit matrix, then $$\text{im}(P) = \{Px \mid x \in F_2^n\} \text{ and } ker(P) = \{x \in F_2^n \mid Px = 0\}$$

are the "image" and "kernel" (or nullspace) respectively of the linear mapping defined by the matrix P. It holds that $\dim(\text{im}(P)) = \text{rank}(P)$ and $\dim(\ker(P)) + \dim(\text{im}(P)) = n$. Further, $\text{rank}(P+Q) \leq \text{rank}(P) + \text{rank}(Q)$ and $\text{rank}(PQ) \leq \min(\text{rank}(P), \text{rank}(Q))$.

If $V \subseteq F_2^n$ is a subvector space of dimension dim (V)=k, then $|V|=2^k$. If $x \in F_2^n$, then any $x+V=\{x+v|v \in V\}$ is called a coset of V in $F_2^n$. Its size is again $2^k$ and there are precisely $2^{n-k}$ many different cosets.

With this background, the problem posed is that, given an invertible linear bit mapping, or bit matrix, $P \in GL_n(F_2)$ where $\pi(P)$ is the corresponding permutation on $2^n$ points, the desire is to design a logic block that permutes a vector of $2^n$ data words with $\pi(P)$. The vector is streamed with a streaming width $2^k$, $k \leq n$. This means that every cycle the logic block takes a segment of length $2^k$ of the vector as input, and produces a segment of equal length of the permuted vector as output. Further, the logic block takes advantage of $2^k$ banks of memory (e.g., addressable portions of memory, such as random access memory or RAM), each of which can hold at least $2^{n-k}$ data words of the vector. In other embodiments, if each available RAM can only hold $2^c$ words, $c<n-k$, then $2^{n-k-c}$ RAMs can be used to simulate a RAM of size $2^{n-k}$. Preferably, each memory can concurrently read and write one (1) data word in each cycle. For example, the RAMs may be dual-ported (e.g., having an input port and an output port). This constraint can easily be generalized to any two-power number of ports.

A logic block satisfying the conditions described above can be implemented on current FPGA (field programmable gate array) platforms or ASICs (application specific integrated circuits).

As shown in FIG. 2, the circuit implementing the permutation may comprise two connection networks 12a-b to permute the data in two stages by writing into the memory banks (RAMs) 14 and reading out from the RAMs 14. The first stage (input data to RAM) is sometimes referred to as the write-stage and the second stage (RAM to output data) as the read-stage. Each stage preferably obeys the port restrictions of the RAMs 14, thereby obviating the need for additional buffers.

Figure 3:
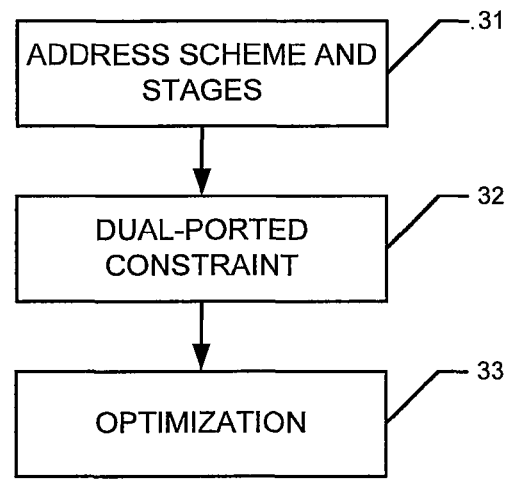
FIG. 3 is a diagram of a process according to various embodiments of the present invention.

In addition to finding a solution for the permutation, the logic blocks of the connection networks 12a-b are also preferably optimized in terms of cost. The steps shown in FIG. 3 may be taken to formulate mathematically the problem. At step 31, the proper addresses to the input vector and the RAMs 14 are assigned. The problem is then to find a suitable factorization of the bit matrix P into a matrix product NM, one matrix for each stage (i.e., write stage and read stage). At step 32, the dual-ported constraint of the RAMs 14 is formulated mathematically as a condition of the submatrices M and N. At step 33, the cost of the connection network is captured through two metrics: (i) the connectivity of the network and (ii) the cost of the control logic. Both metrics are properties of M and N. These steps are described in more detail below.

Figure 4A:
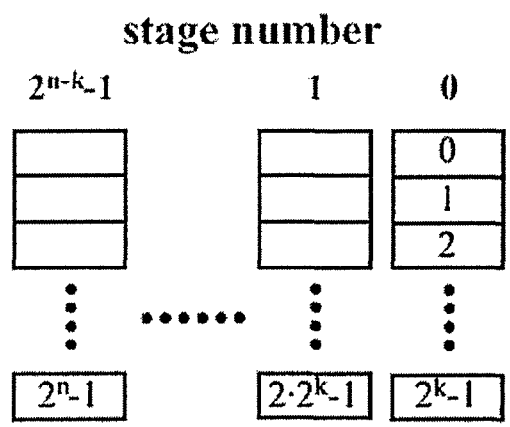
FIG. 4($a$) is a diagram illustrating the indexing of the streamed input vector with addresses according to various embodiments of the present invention.
Figure 4B:
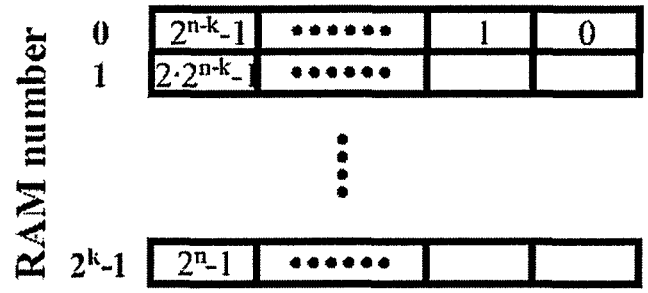

For the address scheme and stages (step 31), the streamed input vector of length $2^n$ may be indexed with addresses $x \in F_2$, as shown in FIG. 4(a). The stage number is given by the upper n-k bits of x and the location within the stage by the lower k bits, referred to as $x_2$ and $x_1$, respectively. The $2^k$ RAMs may be indexed with addresses z as shown in FIG. 4(b). The RAM number $z_1$ is given by the k lower bits of z, and the location $z_2$ in the RAM by the n-k upper bits.

The addressing of the output vector y is analogous to the addressing of the input vector. Preferably P, i.e., y=Px, is performed in two stages, the write-stage z=Mx and the read-stage y=Nz, which is equivalent to a factorization $$P=NM, \quad (3)$$

where M, $N \in GL_n(F_2)$ are again (necessarily) invertible bit matrices. In words, M determines how the streaming data is stored into the RAMs (the write-stage), and N determines how it is read out of the RAMs into the resulting data stream (the read-stage). The addressing preferably is chosen such that $M=I_{2^n}$ or $N=I_{2^n}$ makes the write or read stage trivial, respectively. This means that the connection network and all address computations vanish.

By partitioning the addresses as explained above, the following expanded version of the write-stage z=Mx may be obtained:

$$\text{where in RAM} \begin{pmatrix} z_2 \\ z_1 \end{pmatrix} = \begin{pmatrix} M_4 & M_3 \\ M_2 & M_1 \end{pmatrix} \begin{pmatrix} x_2 \\ x_1 \end{pmatrix} \begin{matrix} \text{stage number} \\ \text{where in stage} \end{matrix} \quad (4)$$

The matrix tiling is compatible with the partitioning of the vectors. For example, $M_1$ is a k×k matrix.

Analogous to the write-stage, the read-stage y=N z may also be expanded. However, there is one crucial difference. Namely, the control logic 16 in FIG. 2 determines from which RAM 14 and where in this RAM to read, given the output stage number and the output stage location. Thus, the inverse equation $z=N^{-1}y$ and partition $N^{-1}$ have to be considered as before as $$\text{where in RAM} \begin{pmatrix} z_2 \\ z_1 \end{pmatrix} = \begin{pmatrix} N'_4 & N'_3 \\ N'_2 & N'_1 \end{pmatrix} \begin{pmatrix} y_2 \\ y_1 \end{pmatrix} \begin{matrix} \text{stage number} \\ \text{where in stage} \end{matrix} \quad (5)$$

The primes emphasize that $N^{-1}$ is tiled and not N.

For step 32, because the RAMs are preferably dual-ported, they allow only one write (and read) per cycle. Thus, it is required that in the write-stage that for every fixed stage, the $2^k$ data words are mapped into different RAMs 14. Mathematically, this means that for any fixed $x_2$ the mapping $$z_1 = M_2 x_2 + M_1 x_1$$

is bijective. This is the case if and only if $M_1$ is invertible, i.e., has full rank: rank($M_1$)=k. A similar discussion yields the requirement rank($N'_1$)=k.

For step 33, the major cost factors in the circuit of FIG. 2 are the two connection networks 12a-b. They are determined by the connections required for writing a stage to the RAMs 14, and for reading from the RAMs 14 into a stage, collected over all stages. In the worst case, an all-to-all connection has to be supported. In the best case, the data words are always written to or read from the same RAM, which reduces the connection network to a simple wired connection without control logic.

Given M and N, the required connectivity can be measured as follows. Let M be as in equation (4) (and N as in equation (5)), and assume that $M_1$ ($N'_1$) is invertible and set rank($M_2$)=s (rank($N'_2$)=s). Then, the $2^k$-to-$2^k$ connection network 12a in the write-stage (read-stage) of FIG. 2 decomposes into $2^{k-s}$ independent $2^s$-to-$2^s$ networks, called blocks. The input and output index sets of these blocks (subsets of $0, \ldots, 2^k-1$) are precisely the cosets:

$$x_1 + im(M_1^{-1}M_2) \text{ and } M_1 x_1 + im(M_2)$$

for the write-stage and are the cosets $$y_1 + im(N'^{-1}_1 N'_2) \text{ and } N'_1 x_1 + im(N'_2)$$

for the read-stage. Further, each block has to support an all-to-all connection and precisely $2^s$ different configurations. We call this the "connectivity lemma."

To prove the connectivity lemma, set $s=\text{rank}(M_2)$ and assume $x_1$ is the address of a stage location. The RAM numbers $z_1$ that $x_1$ connects to can be accumulated, over all stages. This is the set $$U_{x_1} = \{M_2 x_2 + M_1 x_1 \mid x_2 \in F_2^{n-k}\} = \text{im}(M_2) + M_1 x_1 \quad (6)$$

The size of this set is $2^s$. Now assume $x'_1$ is another address within a stage, and satisfies $U_{x_1} \cap U_{x'_1} \neq 0$. Then $$M_1(x_1-x'_1) \in \text{im}(M_2) \Leftrightarrow x'_1 \in x_1 + M_1^{-1}\text{im}(M_2) = x_1 + \text{im}(M_1^{-1}M_2).$$

The size of this set is also $2^s$. Conversely, assume $x'_1$ has the above form, i.e., $x'_1 = x_1 + M_1^{-1} M_2 x_2$ for some $x \in F_2^{n-k}$. Then, using (6), $$U_{x'_1} = \text{im}(M_2) + M_1 x_1 + M_2 x_2 = \text{im}(M_2) + M_1 x_1 = U_{x_1}.$$

In other words, if $x_1$ and $x'_1$ share one connection target $z_1$, they share all $2^s$ targets, which proves the block decomposition. The input and output index sets are also computed as desired.

The above also shows that each block has to support an all-to-all connection. The remaining question is the number of control configurations. Assume two stages $x_2$, $x'_2$ that connect all $x_1$ equally, i.e., for all $x_1 \in F_2^k$, $$M_2 x_2 + M_1 x_1 = M_2 x'_2 + M_1 x_1 \Leftrightarrow x'_2 \in x_2 + \ker(M_2).$$

The size of this set is $2^{n-k-s}$, and the $2^{n-k}$ stages partition into $2^s$ many groups of size $2^{n-k-s}$ each, such that within the groups, all connections are equal. These groups are the cosets $x_2+\ker(M_2)$. Between different groups of stages the connections differ since each $x_1$ has $2^s$ many targets ($|U_{x_1}|=2^s$).

The connectively lemma implies that it is desirable to minimize $\text{rank}(M_2)$ and $\text{rank}(N'_2)$ in (4) and (5) to minimize the area cost of the implementation in FIG. 2. It motivates the following definition for "connectivity:" Given a matrix M in (4) or N in (5), the $\text{conn}(M, k) = 2^{\text{rank}(M_2)}$ and $\text{conn}(N, k) = 2^{\text{rank}(N'_2)}$ are called the connectivity of M and N, respectively, with respect to the streaming width $2^k$. In the following, the second argument k is mostly omitted since it is clear from the context. In words, high connectivity implies high switching cost.

The control blocks 16a-b in FIG. 2 have to compute z given x and z given y, respectively. This motivates the following definition for "control cost" for the control blocks: If M is as in (4) (and N as in (5)), then the cost(M) (or cost(N)) is called the "control cost" of M (or N), defined as the linear complexity of M ($N^{-1}$), i.e., the minimum number of (binary) additions to compute $z=M x$ ($z=N^{-1}x$).

With the above notation and discussion, the problem can be formally stated as, given an invertible bit matrix $P \in GL_n(F_2)$ and a streaming width $2^k$, $k \leq n$, determine a factorization $P=N$ M, such that $\text{rank}(M_1)=\text{rank}(N'_1)=k$. The goal is to minimize $\text{rank}(M_2)$, rank ($N'2$), and the complexity of M and $N^{-1}$. Necessarily, M, $N \in GL_n(F_2)$. This problem is sometimes referred to hereinafter as the "factorization problem."

As an example, let M be the matrix representing the write stage of a permutation, streamed with $2^3$ ports, blocked as in (4).

$$M = \left(\begin{array}{c|c} M_4 & M_3 \\ \hline M_2 & M_1 \end{array}\right) = \left(\begin{array}{ccc|ccc} \cdots & \cdots & 1 & \cdots & \cdots & \cdots \\ \cdots & \cdots & \cdots & 1 & \cdots & \cdots \\ \cdots & \cdots & \cdots & \cdots & 1 & \cdots \\ \hline \cdots & \cdots & \cdots & \cdots & \cdots & 1 \\ 1 & \cdots & \cdots & 1 & \cdots & \cdots \\ \cdots & 1 & \cdots & \cdots & 1 & \cdots \end{array}\right). \quad (7)$$

From the connectivity lemma, it is seen that the 8-to-8 network decomposes into two 4-to-4 blocks. The input set is given by the coset $$x_1 + \text{im}(M_1^{-1} M_2) = x_1 + \text{im}\left(\begin{pmatrix} 0 & 1 & 0 \\ 0 & 0 & 1 \\ 1 & 0 & 0 \end{pmatrix} \cdot \begin{pmatrix} 0 & 0 & 0 \\ 1 & 0 & 0 \\ 0 & 1 & 0 \end{pmatrix}\right)$$

$$= x_1 + \text{im}\begin{pmatrix} 1 & 0 & 0 \\ 0 & 1 & 0 \\ 0 & 0 & 0 \end{pmatrix}$$

$$= x_1 + \left\{\begin{pmatrix} 0 \\ 0 \\ 0 \end{pmatrix}, \begin{pmatrix} 0 \\ 1 \\ 0 \end{pmatrix}, \begin{pmatrix} 1 \\ 0 \\ 0 \end{pmatrix}, \begin{pmatrix} 1 \\ 1 \\ 0 \end{pmatrix}\right\},$$

and the output set is given by the coset $$M_1 x_1 + \text{im}(M_2) = \begin{pmatrix} 0 & 0 & 1 \\ 1 & 0 & 0 \\ 0 & 1 & 0 \end{pmatrix} x_1 + \left\{\begin{pmatrix} 0 \\ 0 \\ 0 \end{pmatrix}, \begin{pmatrix} 0 \\ 0 \\ 1 \end{pmatrix}, \begin{pmatrix} 0 \\ 1 \\ 0 \end{pmatrix}, \begin{pmatrix} 0 \\ 1 \\ 1 \end{pmatrix}\right\},$$

Thus, the input sets are $\{0, 2, 4, 6\}$ and $\{1, 3, 5, 7\}$. The output sets are $\{0, 1, 2, 3\}$ and $\{4, 5, 6, 7\}$. From the "connectivity" definition, it is seen that the connectivity of this network is given by $$\text{conn}(M)=2^{\text{rank}(M_2)}=2^2=4.$$

The definition for "control cost" given above shows that the control cost, cost (M), is given by the linear complexity of M. So, $$\text{cost}(M)=2.$$

Figure 5:
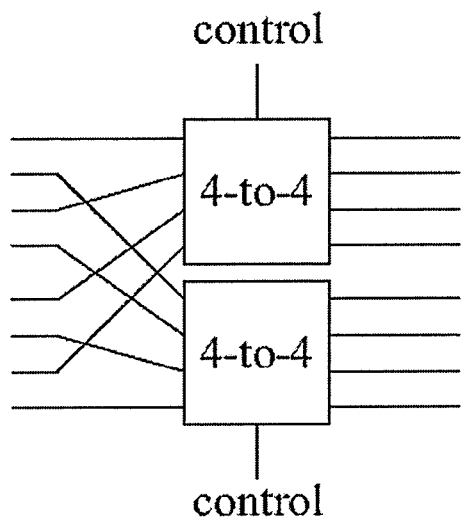
FIGS. 5, 6 and 8 are diagrams of an example datapath of the invention: a 8-to-8 connection network decomposed into two 4-to-4 blocks according to various embodiments of the present invention.

FIG. 5 illustrates this decomposition.

Before providing an explicit method to compute suitable factorizations P=N M, the lower bounds on the quality, i.e., the connectivity and the control cost, may be determined of a possible solution. This will allow later identification of the cases where the solutions are guaranteed optimal. To do this, similar to M and $N^{-1}$ in (4) and (5), P and $P^{-1}$ may also be tiled as $$P=\begin{pmatrix} P_4 & P_3 \\ P_2 & P_1 \end{pmatrix} \text{ and } P^{-1}=\begin{pmatrix} P'_4 & P'_3 \\ P'_2 & P'_1 \end{pmatrix} \quad (8)$$

for the following discussion.

Our "connectivity theorem" is that, assuming P=N M is a solution of the factorization problem, then $$\text{rank}(M_2) \geq k-\text{rank}(P'_1) \text{ and } \text{rank}(N'_2) \geq k-\text{rank}(P_1),$$

which is equivalent to $$\text{conn}(M) \geq 2^{k-\text{rank}(P'_1)} \text{ and } \text{conn}(N) \geq 2^{k-\text{rank}(P_1)}$$

To prove this theorem, assume a solution P=N M, which implies $N^{-1}$ P=M, i.e., the equation $$\begin{pmatrix} N'_4 & N'_3 \\ N'_2 & N'_1 \end{pmatrix} \begin{pmatrix} P_4 & P_3 \\ P_2 & P_1 \end{pmatrix} = \begin{pmatrix} M_4 & M_3 \\ M_2 & M_1 \end{pmatrix}, \quad (9)$$

and $M_1$ and $N'_1$ have full rank k. Further, let r=rank ($P_1$), which implies rank rank ($P_3$)≧k−r, since P has full rank. Equation (9) implies $M_1 = N'_2 P_3 + N'_1 P_1$. From this, the following is obtained:

$$k = \text{rank}(N'_2 P_3 + N'_1 P_1)$$
$$\leq \text{rank}(N'_2 P_3) + \text{rank}(N'_1 P_1)$$
$$\leq \min(\text{rank}(N'_2), \text{rank}(P_3)) + r,$$

As a consequence rank($N'_2$)≧k−r or $$\text{conn}(N) \geq 2^{k-r} = 2^{k - \text{rank}(P_1)}$$

as desired. The bound on conn (M) may be obtained analogously, starting from M $P^{-1} = N^{-1}$.

Our control cost theorem is that, assuming P=N M is a solution, then $$\text{cost}(M) \geq k - \text{rank}(P'_1) \text{ and cost } (N) \geq k - \text{rank}(P_1)$$

To prove this theorem, in the proof of the connectivity theorem, it was asserted that rank ($N'_2$)≧k−rank ($P_1$). This implies that $N'_2$ contains at least k−rank ($P_1$) non-zero elements. Since rank ($N'_1$)=k, the linear complexity of the matrix ($N'_2$ $N'_1$), and thus that of $N^{-1}$, is also at least k−rank ($P_1$). The bound on cost (M) may be obtained analogously.

The connectivity and control cost theorems show that the lower bounds for both the connectivity and the control cost are determined by rank ($P_1$) and rank ($P'_1$), respectively. In the worst case, both ranks are zero.

As an example, consider the stride permutation $$\vec{L}_{2n,4} = \pi(\vec{C}_n^2)$$

streamed with width $2^k$. The corresponding tiling of $P = C_n^2$ as in (8) has, independent of k, the form $$C_n^2 = \begin{pmatrix} 0 & 0 & 1 & & & & & \\ & \ddots & & & & & & \\ & & 1 & & & & & \\ & 0 & & 1 & & & & \\ & & 0 & & 0 & 1 & & \\ \hline & & & & 0 & 0 & 1 & \\ & & & & & & \ddots & \\ & & & & & & & 1 \\ 1 & & & & & & & 0 \\ & 1 & & & & & & 0 \end{pmatrix} \quad (10)$$

In this case rank ($P_1$)=rank ($P'_1$)=k−2 (using $P^{-1} = P^T$). This implies that a solution P=NM that meets the lower bounds satisfies conn (M)=conn (N)=4, i.e., both connection networks decompose into 4-to-4 all-to-all networks. Further, cost (M)=cost (N)=2, i.e., each address computation requires two additions (or xor operations). It is shown later see that such an optimal solution does indeed exist.

In the connectivity lemma, it was established that the two connection networks 12a-b in the write and read stage decompose into block with $2^s$ inputs and outputs, where s=rank ($M_2$) or s=rank ($N'_2$), respectively. In the following, these networks are further analyzed and decomposed to obtain an efficient implementation.

Consider the write stage given by M partitioned as in (4) and with invertible $M_1$. The connection network 12a of the write stage, now considered without subsequent writing into the RAMs 14, performs for every stage a permutation within that stage according to $Z_1 = M_1 X_2 + M_1 X_1$. If the addressing scheme in FIG. 4(a) is adopted for the input and output data streams of the network, then the network is again represented by a bit matrix, namely by $$T = \begin{pmatrix} I_{n-k} & \\ M_2 & M_1 \end{pmatrix} \quad (11)$$

Conversely, every matrix of this form with invertible $M_1$ defines a connection network that decomposes into $2^s$-to-$2^s$ blocks, where s=rank ($M_2$).

To implement efficiently the network, it may be decomposed further. First, $$T = \begin{pmatrix} I_{n-k} & \\ M_2 & I_k \end{pmatrix} \begin{pmatrix} I_{n-k} & \\ & M_1 \end{pmatrix}$$

Next, the following may be used:

$$\begin{pmatrix} I_{n-k} & \\ A & I_k \end{pmatrix} \begin{pmatrix} I_{n-k} & \\ B & I_k \end{pmatrix} = \begin{pmatrix} I_{n-k} & \\ A+B & I_k \end{pmatrix} \quad (12)$$

Namely, $M_2$ may be written as a sum of s=rank ($M_2$) many matrices $T_i$ of rank one, $$M_2 = T_1 + \ldots + T_s. \quad (13)$$

This is possible constructively, for example, by performing Gauss elimination, $M_2 = QM'_2$, where Q is invertible and $M'_2$ has s nonzero rows. Each row yields a summand $T'_i$:

$$M'_2 = T'_1 + \ldots + T'_s,$$

and setting $T_i = QT'_i$ yields the result.

Using equation (12), T in equation (11) can be factorized to decompose the connection network. Analyzing the factors with the connectivity lemma yields the following theorem (which is referred to herein as the "connection network decomposition" theorem): The connection network 12a of the write stage in FIG. 2 is defined by the matrix T in (11). With previous notation, the following factorization is obtained:

$$T = \begin{pmatrix} I_{n-k} & \\ T_1 & I_k \end{pmatrix} \ldots \begin{pmatrix} I_{n-k} & \\ T_{s-1} & I_k \end{pmatrix} \begin{pmatrix} I_{n-k} & \\ T_x & M_1 \end{pmatrix}$$

This implies that the connection network can be decomposed into a cascade of s stages. Each stage is a connection network that consists of parallel 2-to-2 connection networks, or blocks, simultaneously controlled by one control bit. The input and output sets of these blocks are again cosets, as determined by the connectivity lemma. A similar statement holds for connection network of the read stage 12b in FIG. 2.

In equation (13), the summands can be permuted into any order, which implies that the stages can also be permuted. Each stage may be controlled by one bit. This implies that the entire network has $2^s$ many possible configurations. This number coincides with the number stated in the connectivity lemma, as desired. The control bit for each stage may be calculated by $T_i x_2$ (or $T_i y_2$ when performing $N^{-1}$).

The input and output sets of the first (or write) state may be determined by:

$$x_1 + im(M_1^{-1} T_s) \text{ and } M_{1\times 1} + im(T_s).$$

For all other stages $T_i$, where $1 \leq i < s$, both the input and output sets are given by $$x_1 + im(T_i).$$

For the read stage, the same expressions hold, with $N'_1$ substituted for $M_1$.

Continuing the above example, let M be as given in (7). Based on the connection network decomposition theorem, it can be seen that $M_2$ can be decomposed in the following way.

$$M_2 = \begin{pmatrix} 0 & 0 & 0 \\ 1 & 0 & 0 \\ 0 & 1 & 0 \end{pmatrix} = \begin{pmatrix} 0 & 0 & 0 \\ 1 & 0 & 0 \\ 0 & 0 & 0 \end{pmatrix} + \begin{pmatrix} 0 & 0 & 0 \\ 0 & 0 & 0 \\ 0 & 1 & 0 \end{pmatrix} = T_1 + T_2.$$

A matrix with rank 2 ($M_2$) may be decomposed into two matrices of rank 1. This corresponds to breaking the 4-to-4 connection network into two independent 2-to-2 networks. This results in the following factorized connection network T:

$$T = \begin{pmatrix} I & 0 \\ T_1 & I \end{pmatrix} \begin{pmatrix} I & 0 \\ T_2 & M_1 \end{pmatrix} \quad (14)$$

$$= \begin{pmatrix} 1 & \cdots & \cdots & \cdots & \cdots & \cdots \\ \cdots & 1 & \cdots & \cdots & \cdots & \cdots \\ \cdots & \cdots & 1 & \cdots & \cdots & \cdots \\ \cdots & \cdots & \cdots & 1 & \cdots & \cdots \\ 1 & \cdots & \cdots & \cdots & 1 & \cdots \\ \cdots & \cdots & \cdots & 1 & \cdots & 1 \end{pmatrix} \begin{pmatrix} 1 & \cdots & \cdots & \cdots & \cdots & \cdots \\ \cdots & 1 & \cdots & \cdots & \cdots & \cdots \\ \cdots & \cdots & 1 & \cdots & \cdots & \cdots \\ \cdots & \cdots & \cdots & \cdots & \cdots & 1 \\ \cdots & \cdots & \cdots & 1 & \cdots & \cdots \\ \cdots & 1 & \cdots & \cdots & 1 & \cdots \end{pmatrix}$$

Figure 6:
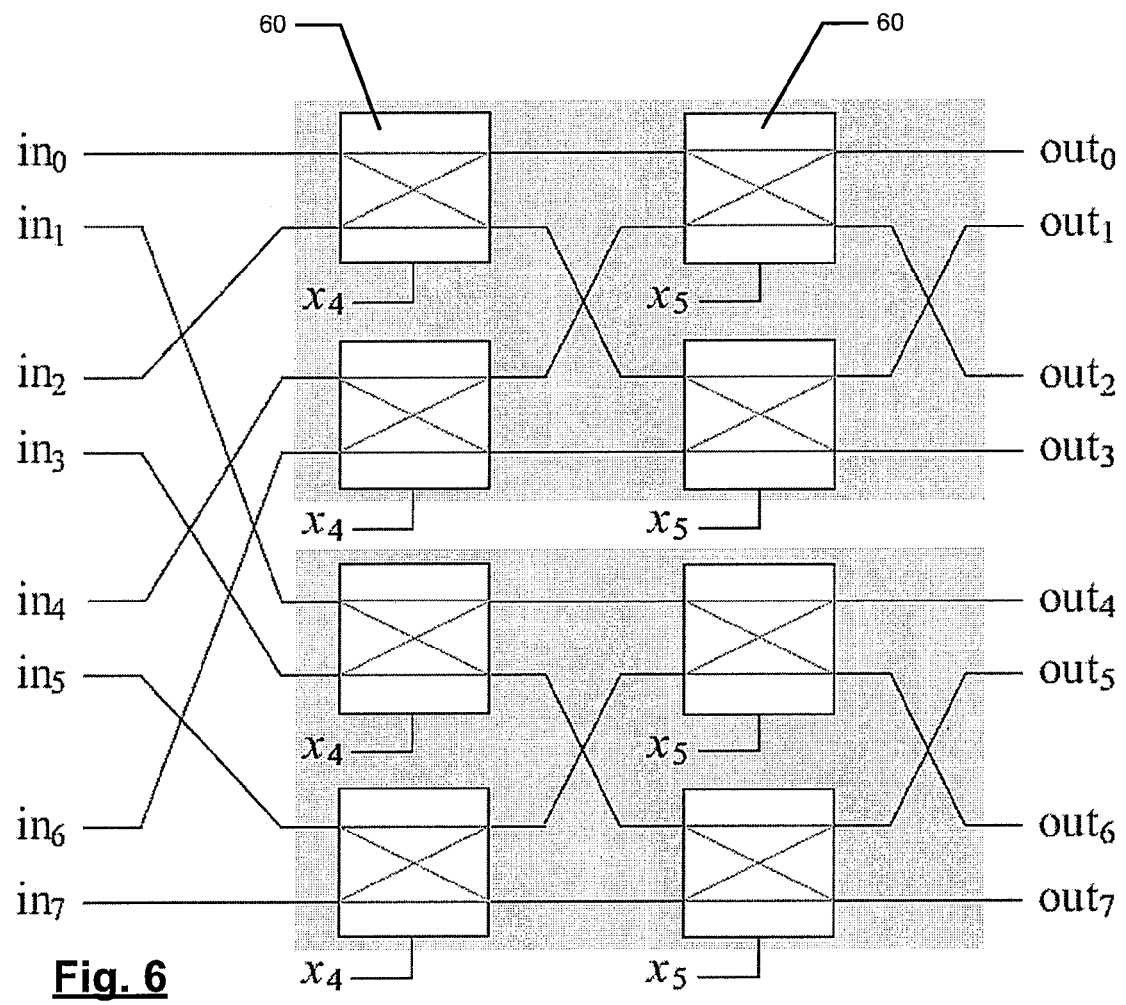

Recall that T operates on a vector x, of length 6. x can be written as $(x_5, x_4, x_3, x_2, x_1, x_0)^T$, where $x_5$ indicates the most significant bit, and $x_0$ indicates the least significant bit. Reading T from right to left allows the resulting connection network to be determined, as shown in FIG. 6, which shows the 8-to-8 connection network corresponding to equation (14). Each 4-to-4 block is decomposed into two cascaded stages. The upper and lower gray boxes highlight the separation between the two independent 4-to-4 blocks. Each column of switches 60 is controlled, in this example, by a single control value ($x_4$ or $x_5$), as shown.

First, the rightmost term may be used to determine the initial permutation and first switching stage. This stage has input sets:

$$\begin{pmatrix} x_2 \\ x_1 \\ x_0 \end{pmatrix} + im(M_1^{-1} T_2) = \begin{pmatrix} x_2 \\ x_1 \\ x_0 \end{pmatrix} + im\begin{pmatrix} 0 & 0 & 0 \\ 0 & 1 & 0 \\ 0 & 0 & 0 \end{pmatrix} = \begin{pmatrix} x_2 \\ x_1 \\ x_0 \end{pmatrix} + \left\{ \begin{pmatrix} 0 \\ 0 \\ 0 \end{pmatrix}, \begin{pmatrix} 0 \\ 1 \\ 0 \end{pmatrix} \right\},$$

and output sets $$M_1 \begin{pmatrix} x_2 \\ x_1 \\ x_0 \end{pmatrix} + im(T_2) = \begin{pmatrix} x_0 \\ x2 \\ x1 \end{pmatrix} + \left\{ \begin{pmatrix} 0 \\ 0 \\ 0 \end{pmatrix}, \begin{pmatrix} 0 \\ 0 \\ 0 \end{pmatrix} \right\}.$$

So, the input sets are $\{0, 2\}, \{1, 3\}, \{4, 6\}$, and $\{5, 7\}$, and the output sets are $\{0, 1\}, \{2, 3\}, \{4, 5\}$, and $\{6, 7\}$. This, along with the initial blocking examined above, gives the initial permutation and switching structure seen in FIG. 6.

Next, the second stage's input and output sets may be determined by $$\begin{pmatrix} x_2 \\ x_1 \\ x_0 \end{pmatrix} + im(T_1) = \begin{pmatrix} x_2 \\ x_1 \\ x_0 \end{pmatrix} \left\{ \begin{pmatrix} 0 \\ 0 \\ 0 \end{pmatrix}, \begin{pmatrix} 0 \\ 1 \\ 0 \end{pmatrix} \right\}$$

So, both the input and out put sets are $\{0, 2\}, \{1, 3\}, \{4, 6\}$, and $\{5, 7\}$. This gives the criss-crossing pattern seen before and after the switching column in FIG. 6. As expected, this network has a connectivity of 4 and a control cost of 2.

To solve the factorization problem outlined above (namely, determining a factorization P=N M, such that rank($M_1$)=rank ($N'_1$)=k), so called "helper matrices," denoted as $H \in GL_n(F_2)$, may be used. According to various embodiments, a helper matrix has the form $$H = \begin{pmatrix} I_{n-k} & \\ H_2 & I_k \end{pmatrix} \quad (15)$$

and, due to (12), is always self-inverse:

$$H = H^1.$$

Given P and any H, the factorization becomes:

$$P = H \cdot HP.$$

Setting N=H and M=HP, it is observed that N satisfies the rank condition rank$N'_2$=k set forth above. The remaining question is how to design H such that the rank condition on M is also satisfied and to minimize the connectivity and control costs.

In one embodiment, to solve this problem, assume P is given tiled as in (8). If M=HP, tiled as in (4), then $$M_1 = H_2 P_3 + P_1.$$

In other words, an $H_2$ must be found such that rank ($M_1$)=k. $H_2$ determines H in (15) and hence the factorization of P in (16). The following theorem (referred to sometimes herewith as the "helper matrix theorem") explains that this is possible. Let $P \in GL_n(F_2)$ be tiled as in (8) with rank ($P_1$)=r≤k; then there exists $H_2$ with rank ($H_2$)=k−r and with exactly k−r non-zero entries such that $M_1 = H_2 P_3 + P_1$ has full rank k. To prove this theorem at the outset, define $E((i_1, j_1), \ldots, (i_k, j_k))$ as the matrix that has ones at the locations $(i_1, j_1), \ldots, (i_k, j_k)$, and zeros elsewhere. The size of the matrix is clear from the context. Assuming $H_2 = E((i, j))$, then $H_2 P_3 + P_1$ is the matrix $P_1$ with the jth row of $P_3$ added to its ith row. This gives the basic idea: k−r suitable rows of $P_3$ are selected and added to suitable k−r rows of $P_1$ to correct its rank deficiency. Intuitively, this is possible since P, and thus its submatrix $$\begin{pmatrix} P_3 \\ P_1 \end{pmatrix},$$

have full rank.

Consider first the special case where P is a permutation of bits, since it is somewhat simpler and important for applications. If P is a permutation, $P_1$ contains r base vectors (as rows); the remaining k−r rows, with row indices $i_1, \ldots, i_{k-r}$ (in any order), are zero. The missing k−r base vectors are in $P_3$, say at row indices $j_1, \ldots, j_{k-r}$. It follows that $H_2 = E((i_1, j_1), \ldots, (i_{k-r}, j_{k-r}))$ satisfies the requirements.

For a general P, more work has to be done to identify the proper row indices. Since $P_1$ has rank r, r linear independent columns of $P_1$ can be permuted into the first r locations, and a Gauss elimination on the columns may be performed to zero out the last k−r columns. In other words, there is an invertible matrix $G \in GL_k(F_2)$ such that $Q_1 = P_1 G$ has the last k−r columns equal to zero. Setting $Q_3 = P_3 G$, the following is obtained:

$$\begin{pmatrix} P_3 \\ P_1 \end{pmatrix} = \begin{pmatrix} Q_3 \\ Q_1 \end{pmatrix} G^{-1}.$$

Now, r linear independent rows of $Q_1$ may be identified, and the other row indices (in any order) may be called $i_1, \ldots, i_{k-r}$. In each of the rows, the rightmost k−r entries are equal to zero. Since $$\begin{pmatrix} Q_3 \\ Q_1 \end{pmatrix}$$

has full rank, there are k−r rows whose subvectors, consisting of the k−r rightmost entries, are linear independent. Their indices may be denoted by $j_1, \ldots, j_{k-r}$. Setting $H_2 = E((i_1, j_1), \ldots, (i_{k-r}, j_{k-r}))$, it is clear that $H_2 Q_3 + Q_1$ has full rank and so does $(H_2 Q_3 + Q_1) G^{-1} = M_1$ The other requirements are also satisfied by $H_2$.

This proof of this theorem is constructive and yields the following algorithm (referred to as the "factorization algorithm") for solving the factorization problem discussed above. Assume an input permutation of $P \in GL_n(F_2)$ and $k \leq n$, with the goal of obtaining an output $N, M \in GL_n(F_2)$ such that $P = NM$ and $\text{rank}(M_1) = \text{rank}(N'_1) = k$.

Figure 7A:
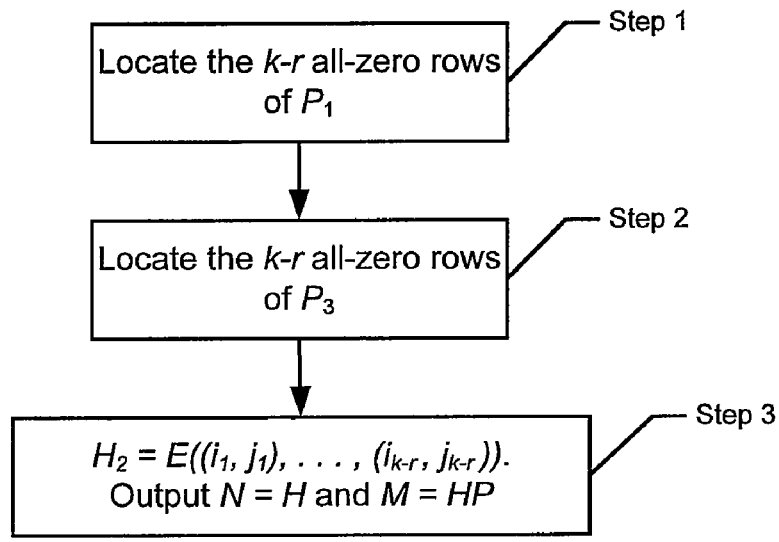
Figure 7B:
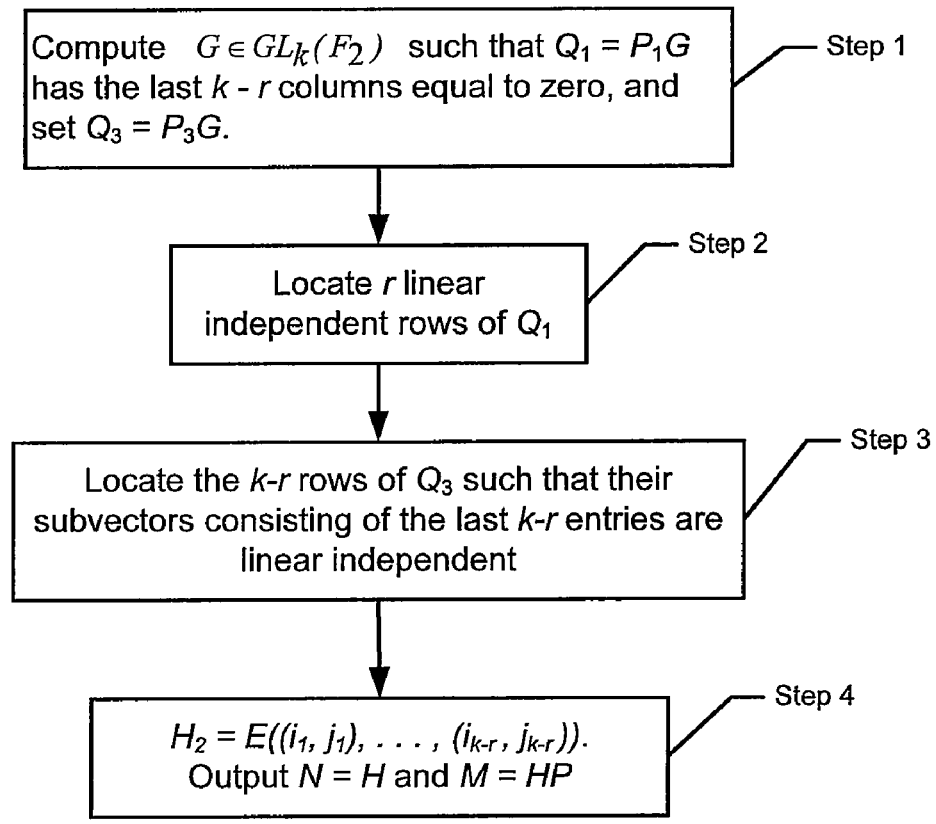

For a case where P is a permutation of bits (a matrix having exactly one 1 in each row and exactly one 1 in each column, with zero elsewhere), the process, as shown in FIG. 7a, involves:

(1) Locating the k−r all-zero rows of $P_1$, denoting their indices (in any order) with $i_1 \ldots, i_{k-r}$.
(2) Locating the k−r non-zero rows of $P_3$, denoting their indices with $j_1, \ldots, j_{k-2}$,
(3) Setting $H_2 = E((i_1, j_1), \ldots, (i_{k-r}, j_{k-r}))$. Output N=H and M=HP For cases of an arbitrary P, the process, as shown in FIG. 7b, involves:

(1) Computing $G \in GL_k(F_2)$ such that $Q_1 = P_1 G$ has the last k−r columns equal to zero, and setting $Q_3 = P_3 G$.
(2) Locating r linear independent rows of $Q_1$, denoting the remaining row indices (in any order) by $i_1, \ldots, i_{k-r}$.
(3) Locating k−r rows of $Q_3$ such that their subvectors consisting of the last k−r entries are linear independent, and denote the row indices with $j_1, \ldots, j_{k-r}$.
(4) Setting $H_2 = E((i_1, j_1), \ldots, (i_{k-r}, i_{k-r}))$. Output N=H and M=HP.

The correctness of the factorization algorithm follows from the helper matrix theorem.

In addition, the factorization algorithm terminates and is correct. Also, the factorization algorithm always produces a "partially" optimal solution, that is, at least one stage is optimal. In some important cases, such as stride permutations and other, the solution is optimal (i.e., both stages are optimal). This theorem, referred to as the "optimality theorem," is that, for a given permutation P and k (related to the streaming width), the factorization algorithm produces a solution in which the read-stage is optimal with respect to both connectivity and control cost. Further, if P is a permutation of bits, then also the write-stage is optimal with respect to both connectivity and control cost. To prove this theorem, the lower bounds for the connectivity and control cost theorems can be compared. For the read stage, the helper matrix theorem establishes that in the factorization algorithm $N'_2 = H_2$ has rank k−r. Thus conn $(N) = 2^{k-\text{rank}(P_1)}$, which is minimal (see connectivity theorem). Further, $N^{-1} = H$ incurs k−r additions, i.e., cost(N)=k−rank ($P_1$), which also is minimal (see control cost theorem).

For the write-stage, if permutation P is a permutation of bits, then M=HP, which implies $M_2 = H_2 P_4 + P_2$. Since rank $(P_1) = r$, rank $(P_2) = k-r$. $H_2$ is constructed to extract the k−r nonzero rows with indices $j_l$ from $P_3$. Since P is a permutation, this implies that the $j_l$th row of $P_4$ is zero. As a consequence, $H_2 P_4$ is zero and thus $M_2 = P_2$. Further, $P^{-1} = P^T$ and, hence, $P'_1 = P_1^T$. In summary, rank $(M_2) = k-r = k-\text{rank}(P_1) = k-\text{rank}(P'_1)$, which is minimal (see connectivity theorem). Further, M incurs k−r additions, i.e., cost (M)=k−rank ($P'_1$), which is minimal (see control cost theorem).

As just demonstrated, for bit permutations P, the factorization algorithm produces optimal solutions. A few other special properties hold in this case and are discussed next. The proof of the optimality theorem asserts that if P is a bit permutation, then the algorithm yields $M_2 = P_2$. In other words, M has the form $$M = \begin{pmatrix} P_4 & P_3 \\ P_2 & H_2 P_3 + P_1 \end{pmatrix} \quad (17)$$

and, hence, differs from P only in the bottom right k×k submatrix. In the general case, both bottom submatrices $M_1$, $M_2$ differ. Further, the matrix $M_1 = H_2 P_3 + P_1$ is a permutation matrix in this case, since it has full rank and at most k and thus precisely k nonzero entries. Finally, the matrix $H_2$ obtained by the factorization algorithm contains exactly k−r ones, which are located in precisely those rows of $P_1$ that are zero. The same holds for $P_2$. Since rank $(P_2) = \text{rank}(H_2) = k-r$, one gets im $(M_2) = $ im $(P_2) = $ im $(H_2) = $ im $(N'_2)$. As a consequence, recalling that if M is as in equation (4) (and N as in equation (5)), and assuming that $M_1$ ($N'_1$) is invertible and set rank($M_2$)=s (rank($N'_2$)=s), then the $2^k$-to-$2^k$ connection network 12a in the write-stage (12b in the read-stage) of FIG. 2 decomposes into $2^{k-s}$ independent $2^s$-to-$2^s$ networks, the blocking of the two connection networks 12*a-b* in FIG. 2 is compatible.

For the connection networks, the read stage of the solutions produced by the factorization algorithm has the form $$N' = N = \begin{pmatrix} I_{n-k} \\ E((i_1, j_1), \ldots, (i_{k-r}, j_{k-r}))I_k \end{pmatrix}$$

This makes the decomposition of the connection network according to the connection network decomposition theorem easy by setting $$T_l = E((i_l, j_l)).$$

As an example, one may derive a solution for $P=C_6^2$ streamed with width $2^3$, as shown below. Performing the above algorithm step by step, P is a permutation, thus the algorithm of FIG. 7*a* applies.

$$P = \begin{pmatrix} \ldots & \ldots & 1 & \ldots & \ldots & \ldots \\ \ldots & \ldots & \ldots & 1 & \ldots & \ldots \\ \ldots & \ldots & \ldots & \ldots & 1 & \ldots \\ \hline \ldots & \ldots & \ldots & \ldots & \ldots & 1 \\ 1 & \ldots & \ldots & \ldots & \ldots & \ldots \\ \ldots & 1 & \ldots & \ldots & \ldots & \ldots \end{pmatrix}.$$

Step 1: $P_1$ has two all-zero rows, namely the last two with indices $i_1=2$ and $i_2=1$.
Step 2: $P_3$ has two non-zero rows, namely the last two with indices $j_1=2$ and $j_2=1$.
Step 3: Therefore, $H_2=E((2,2),(1,1))$; $H_2$ is a 3 3 matrix with two 1 values. The desired factorization is readily computed through $N=H$, $M=HC_6^2$ $$C_6^2 = \begin{pmatrix} 1 & \ldots & \ldots & \ldots & \ldots & \ldots \\ \ldots & 1 & \ldots & \ldots & \ldots & \ldots \\ \ldots & \ldots & 1 & \ldots & \ldots & \ldots \\ \hline \ldots & \ldots & \ldots & 1 & \ldots & \ldots \\ \ldots & 1 & \ldots & \ldots & 1 & \ldots \\ \ldots & \ldots & 1 & \ldots & \ldots & 1 \end{pmatrix} \begin{pmatrix} \ldots & \ldots & 1 & \ldots & \ldots & \ldots \\ \ldots & \ldots & \ldots & 1 & \ldots & \ldots \\ \ldots & \ldots & \ldots & \ldots & 1 & \ldots \\ \hline \ldots & \ldots & \ldots & \ldots & \ldots & 1 \\ 1 & \ldots & \ldots & 1 & \ldots & \ldots \\ \ldots & 1 & \ldots & \ldots & 1 & \ldots \end{pmatrix} \quad (18)$$

M matches (17) and $M_1$ is a permutation matrix as asserted above. Further, the solution has to be optimal for the reasons discussed. Indeed, conn (M)=conn (N)=4 and cost (M)=cost (N)=2, which meets the lower bounds for the connectively and control cost theorems. It is interesting to note that the solution introduces bit arithmetic, namely two additions or xors for each address computation, even though the original P requires none.

Figure 8:
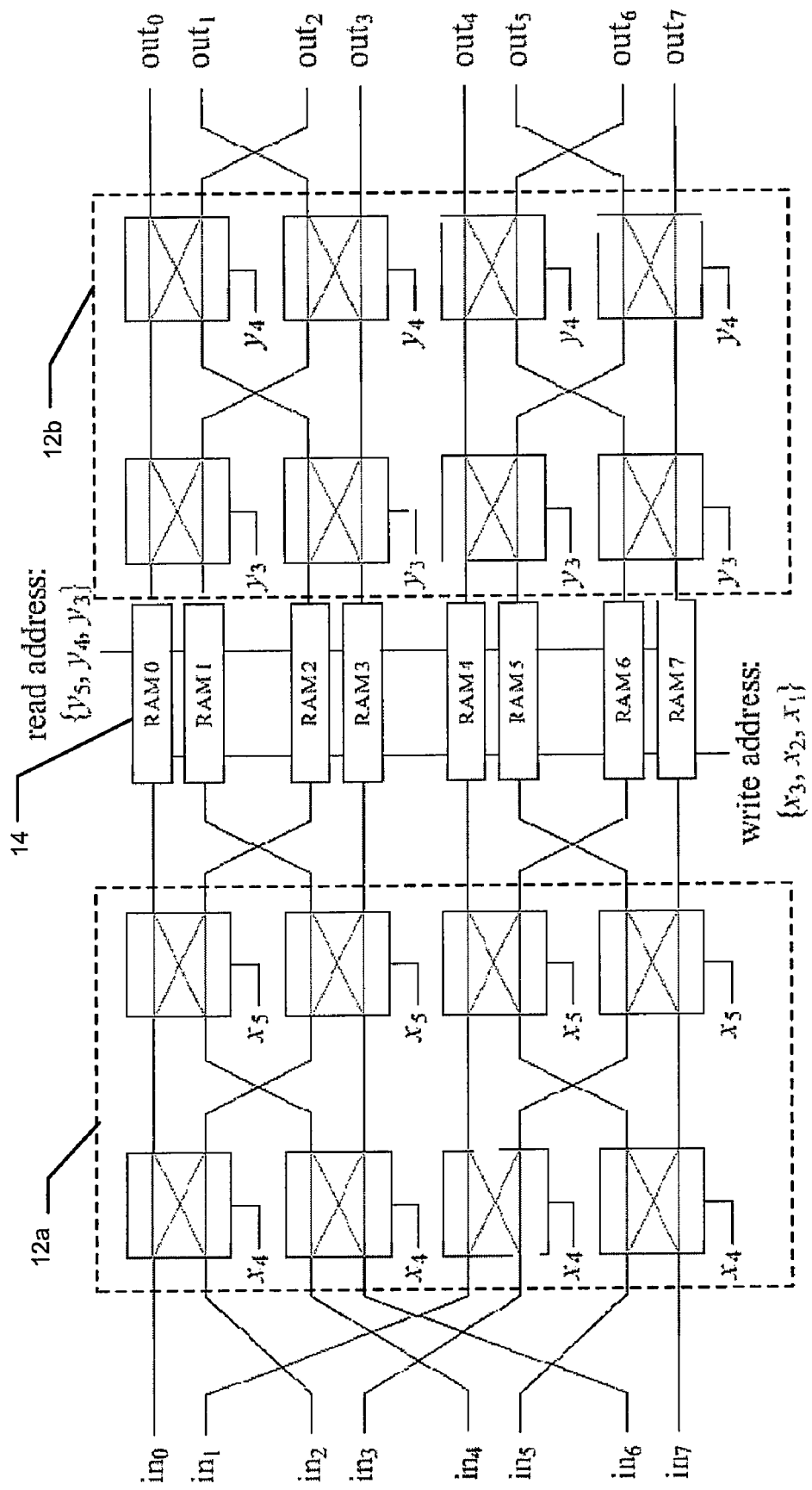

Now, the complete hardware implementation of this example is discussed, seen in FIG. 8. Note that M corresponds to the matrix M seen in (7), so M may be implemented as in the previous example, seen in FIG. 6.

Considering the input vector of length 64 to be indexed with addresses, $x \in F_2^6$, with the upper three (3) bits corresponding to the stage number, and the lower three (3) bits indicating the location within the stage. x may be written as $(x_5, x_4, x_3, x_2, x_1, x_0)^T$, with $x_5$ as the most significant bit and $x_0$ as the least significant. Likewise, the output vector may be indexed with address $y \in F_2^6$ of the same form.

The factorization of M's connection network was previously shown in (14). From this, the following characteristics for the write stage are determined. As explained in the example above, the first stage is controlled by $x_4$ and the second stage is controlled by $x_5$. As discussed above, the memory write addresses are calculated directly from M. The write addresses are given by $M_4 x_2 + M_3 x_1$. So, this gives memory write addresses $$M_4 x_2 + M_3 x_1 = \begin{pmatrix} 0 & 0 & 1 \\ 0 & 0 & 0 \\ 0 & 0 & 0 \end{pmatrix} \begin{pmatrix} x_5 \\ x_4 \\ x_3 \end{pmatrix} + \begin{pmatrix} 0 & 0 & 0 \\ 1 & 0 & 0 \\ 0 & 1 & 0 \end{pmatrix} \begin{pmatrix} x_2 \\ x_1 \\ x_0 \end{pmatrix} = \begin{pmatrix} x_3 \\ x_2 \\ x_1 \end{pmatrix}.$$

It is seen that the memory address where each word must be written is the three bit value given by $(x_3, x_2, x_1)^T$. The input and output connections of each block may be determined from the cosets, as discussed above.

The same process may be performed for N. Note that $N=N^{-1}$, so all $N'_i$ matrices are equal to the $N_i$ versions. $N^{-1}$ may be decomposed, using the connection network decomposition theorem, to $$N^{-1} = \begin{pmatrix} 1 & \ldots & \ldots & \ldots & \ldots & \ldots \\ \ldots & 1 & \ldots & \ldots & \ldots & \ldots \\ \ldots & \ldots & 1 & \ldots & \ldots & \ldots \\ \hline \ldots & \ldots & \ldots & 1 & \ldots & \ldots \\ \ldots & 1 & \ldots & \ldots & 1 & \ldots \\ \ldots & \ldots & 1 & \ldots & \ldots & 1 \end{pmatrix}$$

$$= \begin{pmatrix} 1 & \ldots & \ldots & \ldots & \ldots & \ldots \\ \ldots & 1 & \ldots & \ldots & \ldots & \ldots \\ \ldots & \ldots & 1 & \ldots & \ldots & \ldots \\ \hline \ldots & \ldots & \ldots & 1 & \ldots & \ldots \\ \ldots & 1 & \ldots & \ldots & 1 & \ldots \\ \ldots & \ldots & \ldots & \ldots & \ldots & 1 \end{pmatrix} \begin{pmatrix} 1 & \ldots & \ldots & \ldots & \ldots & \ldots \\ \ldots & 1 & \ldots & \ldots & \ldots & \ldots \\ \ldots & \ldots & 1 & \ldots & \ldots & \ldots \\ \hline \ldots & \ldots & \ldots & 1 & \ldots & \ldots \\ \ldots & \ldots & \ldots & \ldots & 1 & \ldots \\ \ldots & \ldots & \ldots & \ldots & \ldots & 1 \end{pmatrix}$$

The first stage has input sets $$\begin{pmatrix} x_2 \\ x_1 \\ x_0 \end{pmatrix} + \text{im}(N_1'^{-1} T_2) = \begin{pmatrix} x_2 \\ x_1 \\ x_0 \end{pmatrix} + \left\{ \begin{pmatrix} 0 \\ 0 \\ 0 \end{pmatrix}, \begin{pmatrix} 0 \\ 0 \\ 1 \end{pmatrix} \right\}$$

and output sets given by $$N_1' \begin{pmatrix} x_2 \\ x_1 \\ x_0 \end{pmatrix} + \text{im}(T_2) = \begin{pmatrix} x_2 \\ x_1 \\ x_0 \end{pmatrix} + \text{im} \begin{pmatrix} 0 & 0 & 0 \\ 0 & 0 & 0 \\ 0 & 0 & 1 \end{pmatrix} = \begin{pmatrix} x_2 \\ x_1 \\ x_0 \end{pmatrix} + \left\{ \begin{pmatrix} 0 \\ 0 \\ 0 \end{pmatrix}, \begin{pmatrix} 0 \\ 0 \\ 1 \end{pmatrix} \right\}.$$

The second stage has input and output sets given by $$\begin{pmatrix} x_2 \\ x_1 \\ x_0 \end{pmatrix} + \text{im}(T_1) = \begin{pmatrix} x_2 \\ x_1 \\ x_0 \end{pmatrix} + \text{im} \begin{pmatrix} 0 & 0 & 0 \\ 0 & 1 & 0 \\ 0 & 0 & 0 \end{pmatrix} = \begin{pmatrix} x_2 \\ x_1 \\ x_0 \end{pmatrix} + \left\{ \begin{pmatrix} 0 \\ 0 \\ 0 \end{pmatrix}, \begin{pmatrix} 0 \\ 1 \\ 0 \end{pmatrix} \right\}.$$

So, the first stage has input and output sets $\{0, 1\}$, $\{2, 3\}$, $\{4, 5\}$, and $\{6, 7\}$. The second stage has input and output sets $\{0, 2\}$, $\{1, 3\}$, $\{4, 6\}$, and $\{5, 7\}$. Using the technique described above, it is seen that the first stage is controlled by $y_3$, and the second by $y_4$. The memory read addresses may be determined from $$N_4' y_2 + N_3' y_1 = \begin{pmatrix} 1 & 0 & 0 \\ 0 & 1 & 0 \\ 0 & 0 & 1 \end{pmatrix} \begin{pmatrix} y_5 \\ y_4 \\ y_3 \end{pmatrix} + \begin{pmatrix} 0 & 0 & 0 \\ 0 & 0 & 0 \\ 0 & 0 & 0 \end{pmatrix} \begin{pmatrix} y_2 \\ y_1 \\ y_0 \end{pmatrix} = \begin{pmatrix} y_5 \\ y_4 \\ y_3 \end{pmatrix}.$$

So, the memory read addresses are given by the three bit value $(y_5, y_4, y_3)^T$. The resulting implementation is visualized in FIG. 8, which shows the hardware corresponding to $C_6^2$ with stream width 8, as decomposed in (18). Once the factorization problem is solved, a synthesized hardware description language (HDL) file may be generated, that may be synthesized to generate the hardware circuit to implement the permutation.

FIG. 9 is a diagram of a computer system 90 according to various embodiments of the present invention. The computer system 90 comprises a computer device 92, such as a personal computer, laptop, server, workstation, etc. The computer device 92 comprises a processor 94 and a memory 96. The processor 92 may have one or multiple cores. The memory 94 may be a random access memory (e.g., a DRAM). The memory 96 comprises a factorization software module 98 and a hardware description language (HDL) generation software module 100. The factorization software module 98 may comprise computer instructions that, when executed by the processor 92, cause the processor 92 to factorize an input permutation P, given an input stream width (k), to compute the write stage bit matrix M and the read-stage bit matrix N, where P=NM, and rank($M_1$)=rank ($N'_1$)=k, with optimal connectivity and cost, as described above. The control bits and the address bits are also determined, as described above. The permutation P and the stream width k may be read from a data file, for example. Based on the computed write- and read-stage matrices for the connection networks 12*a-b*, the control bits for the control logic 16*a-b*, and the address bits for the RAMs 14, the HDL generation software module 100 may generate a HDL, synthesizable file 101 that describes a circuit for implementing the reorderings of the input permutation P. The HDL file may be, for example, a Verilog file. The HDL file 101 may be stored in a file or database associated with the computer system 90. It may also be transported via a computer network to a remote computer system (not shown). Of course, the computer system 90 may comprise one or a number of distributed computing devices 92. In addition, the computing device(s) 92 may comprise one or a number of processors 94 and/or one or a number of memory units 96.

FIG. 10 shows a computer implemented process according to various embodiments of the present invention. At step 102, the input permutation P and the stream width k are received. Next, at step 104, the write- and read-stage matrices for the connection networks 12*a-b*, the control bits for the control logic 16*a-b*, and the address bits for the RAMs 14 are calculated, using the techniques described above. Then, at step 106, the HDL synthesizable file 102 is generated. Next, at step 108, the hardware circuit 10 may be constructed based on the HDL synthesizable file 102. The circuit 10 may be implemented in, for example, a FPGA platform or an ASIC. The connection networks 12*a-b* may be implemented as switches or multiplexers, for example.

Figure 11:
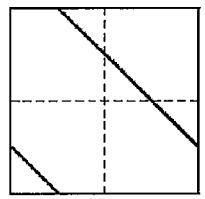

For purposes of illustration, now presented are seven example permutations with their full solutions. In addition to an exact specification, a visual representation of the solution matrices is used to show the form of the matrix under general conditions. In these figures, each box represents a matrix P, N, or M. The dashed lines show the divisions between the sub-matrices, and the solid black lines indicate segments with value 1 in the matrix. Gray boxes are used to indicate portions of the matrix that are unknown or not specified in the problem. Lastly, the blank areas of the box indicate portions of the matrix equal to zero. For example, the matrix $C_n^2$ given in (10) is represented as shown in FIG. 11.

EXAMPLE 1

Figure 12:
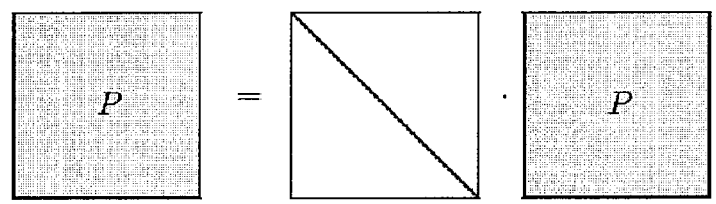
Figure 13:
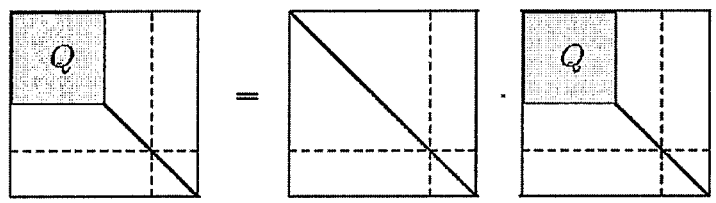
Figure 14:
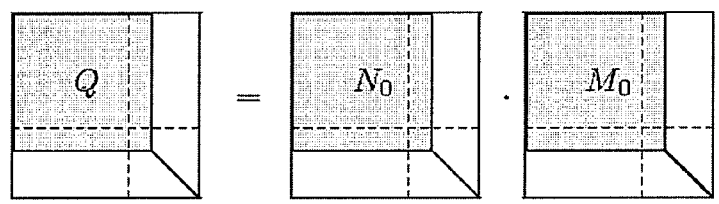

P with full rank($P_1$). If the bottom-right matrix $P_1$ has full rank (i.e., rank($P_1$)=k), then P fulfills the restrictions by itself. So, a solution of P=N·M is given by P=I·IP. This factorization can be visualized as shown in FIG. 12. The costs of N are given by:

cost($N$)=0 and conn($N$)=1.

The cost of M, cost(M), is equal to the linear complexity of P, and the connectivity, conn(M)=rank($P_2$).

EXAMPLE 2

$\pi(Q) \Leftrightarrow I$. Given $\pi(Q) \Leftrightarrow I_{\cdot 2^l}$, then $P=Q \oplus I_l$. For the case where $l \geq k$, under this condition, $P_1$ has full rank and the problem is solved as in Example 1 above. This produces solution shown in FIG. 13. For the case where l<k, a factorization Q=$N_0 \cdot M_0$ is found, with a streaming width of k-l. This solution has the form shown in FIG. 14. Once this solution is found, the values for N and M are found according to:

$N=N_0 \oplus I_l$, $M=M_0 \oplus I_l$

The arithmetic and connection costs of N and M are identical to the costs for $N_0$ and $M_0$ (respectively).

EXAMPLE 3

$I \Leftrightarrow \pi(Q)$. Given $\pi(P)=I_2' \Leftrightarrow \pi(Q_m)$, then $P=I_l \oplus Q_m$. For the case where $m \leq k$, $P_1$ has full rank, so the factorization is trivial. Using the "full-rank" solution seen in Example 1, the solution shown in FIG. 15 may be obtained. For the case where m>k, the factorization $Q=N_0 \cdot M_0$ is first solved, with a streaming width of k. Then, N and M are found according to:

$N=I_{k-m} \oplus N_0$, $M=I_{k-m} \oplus M_0$

The resulting solution will have the costs:

cost($N$)=cost($N_0$), conn($N$)=conn($N_0$), cost($M$)=cost($M_0$), conn($M$)=conn($M_0$).

The solution has the form shown in FIG. 16.

EXAMPLE 4

$I \Leftrightarrow \pi(Q) \Leftrightarrow I$. If $\pi(P)=I_2 \cdot \Leftrightarrow \pi(Q_m) \Leftrightarrow I_{2^h}$, then $P=I_l \oplus Q_m \oplus I_h$. If $k \leq h$, then $P_1$ has full rank, so the solution follows Example 1 above. If k>h, P can be regrouped as $P=I_l \oplus (Q_m \oplus I_h)$, and the solution can be found as in the $I \Leftrightarrow \pi(Q)$ case, which is Example 3 above.

EXAMPLE 5

Stride permutation L. A solution for stride permutation $\pi(P)=L_{2^n,2^s}$, streamed with width 2k, $1 \leq k \leq n-1$ is derived. From the discussion above, it is seen that $P=C_n^s$. Let r=rank ($P_1$).

$$r = \begin{cases} 0, & k < s \text{ and } k < n-s \\ k-s, & s \leq k \leq n-s \\ k-(n-s), & n-s < k < s \\ 2k-n, & k > n-s \text{ and } k > s \end{cases} \quad (19)$$

Applying the factorization algorithm described above, the helper matrix $H_2$ is obtained:

$$H_2 = E((\min(k, n-s)-i, n-\max(s, k)-i | i=1 \ldots, k-r) \quad (20)$$

Thus, $$H = \begin{pmatrix} I_{n-k} & \\ H_2 & I_k \end{pmatrix} \quad (21)$$

allows the final factorization to be computed according to $N=H$, $M=HC_n^s$. This factorization yields $\text{cost}(M)=\text{cost}(N)=k-r$ and $\text{conn}(N)=\text{conn}(M)=2k-r$. For the case where $k<s$ and $k<n-s$, the $P=C_n^s=N\cdot M$ has the form shown in FIG. 17. For the case where $s\leq k\leq n-s$, then $P_1$ has one or more non-zero rows, which occur at the top of the matrix. $P=C_n^s=N\cdot M$ has the form shown in FIG. 18. For the case where $n-s<k<s$, then $P_1$ has one or more non-zero rows, which occur at the bottom of the matrix. $P=C_n^s=N\cdot M$ has the form shown in FIG. 19. For the case where $k>n-s$ and $k>s$, then $P_1$ has one or more non-zero rows, which occur at the top and bottom of the matrix. $P=C_n^s=N\cdot M$ has the form shown in FIG. 20.

EXAMPLE 6

Bit reversal R. If $\pi(P)=R_{2^n}$, then it is seen, based on the above discussion, that $P=J_n$. If $r=\text{rank}(P_1)$, then $r=2\cdot\max(0, k-n/2)$. Applying the factorization algorithm discussed above, the helper matrix $H_2$ is obtained:

$$H_2 = E((r+i, i) | i=0, \ldots, k-r) \quad (22)$$

Then, using $P=N\cdot M=H\cdot HP$, a solution with the following costs is produced:

$$\text{cost}(M)=\text{cost}(N)=k-r, \text{conn}(M)=\text{conn}(N)=2k-r.$$

For the case where $k\leq n/2$, the solution has the form shown in FIG. 21. For the case where $k>n/2$, the solution has the form shown in FIG. 22.

EXAMPLE 7

Hadamard reordering. The Hadamard reordering permutes the 2n-element data vector $X=(x_0, x_1, \ldots, x_2^{n-1})^T$ to the vector $Y=(xh_2n_{(0)}, xh_2n_{(1)}, \ldots, xh_2n_{(2n-1)})^T$, where $h_{2^n}(\cdot)$ is recursively generated according to:

$$h_1(0)=0$$

$$h_{2K}(2i)=h_K(i)$$

$$h2_K(2i+1)=2K-1-h_K(i), i=0, 1, \ldots, K-1.$$

This permutation is represented as the matrix $Z_{2^n}$. If $\pi(P)=Z_{2^n}$, then $P=S_n$, defined as $$S_n = \begin{pmatrix} & & 1 & 1 \\ & \cdots & \cdots & \\ 1 & \cdots & & \\ 1 & & & \end{pmatrix} \quad (23)$$

If $r=\text{rank}(P_1)$, then $r=\max(0, 2k-n)$. Applying the factorization algorithm, the helper matrix $H_2$ is obtained:

$$H_2 = E((k-1i, k-r-i) | i=0, \ldots, k-r-1) \quad (24)$$

For the case where $k\leq n/2$, the solution $P=N\cdot M=H\cdot HP$ has the form shown in FIG. 23. For the case where $n/2<k<n/2+1$, the solution has the form shown in FIG. 24. In addition, for the case where $k\geq n/2+1$, the solution has the form shown in FIG. 25. These solutions have the following costs:

$$\text{cost}(M)=n-1+2(k-r)\ \text{cost}(N)=k-r\ \text{conn}(M)=\text{conn}(N)=2k-r.$$

Table I below includes a summary of the example bit matrices and their solutions.

TABLE I

| P | $\pi(P)$ | solution | conn(M) | conn(N) | cost(M) | cost(N) | optimal |
|---|---|---|---|---|---|---|---|
| $C_n$ | $L_{2^n,2^s}$ | (21) | | | | | |
| Case 1: $k < \min(s, n-s)$, | | | $2^k$ | $2^k$ | k | k | yes |
| Case 2: $s \leq k \leq n-s$, | | | $2^s$ | $2^s$ | s | s | yes |
| Case 3: $n-s < k < s$, | | | $2^{n-s}$ | $2^{n-s}$ | n−s | n−s | yes |
| Case 4: $k > \max(n-s, s)$, | | | $2^{n-k}$ | $2^{n-k}$ | n−k | n−k | yes |
| $J_n$ | $R_{2^n}$ | (22) | | | | | |
| Case 1: $k \leq n/2$, | | | $2^k$ | $2^k$ | k | k | yes |
| Case 2: $k > n/2$, | | | $2^{n-k}$ | $2^{n-k}$ | n−k | n−k | yes |
| $S_n$ | $Z_{2^n}$ | (24) | | | | | |
| Case 1: $k \leq n/2$, | | | 2k | $2^k$ | k | n−1+2k | ? |
| Case 2: $n/2 < k < n/2+1$, | | | $2^{k-1}$ | $2^{k-1}$ | k−1 | n−3+2k | ? |
| Case 3: $k \geq n/2+1$, | | | $2^{n-k}$ | $2^{n-k}$ | n−k | 3n−2k−1 | ? |

The streaming permutations considered in this application have a wide range of applications.

Some of the most important applications include transforms, transposition, sorting networks, and Viterbi coding, many of which access data in a stride permutation pattern.

Permutations are extremely important in fast computation of linear transforms. The Cooley-Tukey fast Fourier transform (FFT) and its variants use stride permutation L and bit reversal R. A similar Cooley-Tukey-like fast algorithm for the Walsh-Hadamard transform (WHT) also uses stride permutation L. Streaming permutations are applicable to fast algorithms for the discrete cosine transform (DCT) and discrete sine transform (DST). Fast Cooley-Tukey type algorithms for these transforms have been derived. These algorithms use the stride permutation, as well as the permutation $K_{2^n,2^m}$, defined $$K_{2^n,2^m} = (I_{2^m-l} \Longleftrightarrow (I_{2^{n-m}} \oplus J_{2^{n-m}})) L_{2^n,2^m}$$

If $\pi(Q)=I_{2^{n-m}} \oplus J_{2^{n-m}}$, then $$Q = \begin{pmatrix} 1 & & & \\ 1 & 1 & & \\ \cdots & & \cdots & \\ 1 & & & 1 \end{pmatrix}$$

So, if $\pi(P)=K_{2^n,2^m}$, then $$P=(I_{m-1} \oplus Q)C_n^m.$$

The K permutation is linear on the bits, so it can be implemented by the factorization algorithm.

In addition to Cooley-Tukey type algorithms, fast regularized (or constant geometry) algorithms for computing the DCT and DST exist. These algorithms require the stride permutation L as well as the Hadamard reordering, $Z_{2^n}$, seen in Example 7 above.

Additionally, some optimizations in the transform domain can be simply implemented using embodiments of the present invention. For example, the prior art shows how the bit reversal and matrix transposition needed in the 2-D FFT can be performed together at a reduced cost. According to various embodiments, this optimization is easily realized as $$\pi(P)=(I_{2^n}\oplus R_{2^m})L_{2^{n^2},2^m} \text{ and } P=(I_n\oplus J_n)\cdot C_{n^2}{}^n$$

Permutations can be important applications themselves. For example, the transposition (or corner turn) of an n n matrix is simply the stride permutation $L_{n^2,n}$. Transposition is a very important application; it is commonly used in multi-dimensional separable signal processing (e.g., multi-dimensional DFT, image processing, etc.). This permutation is easily implemented with embodiments of the present invention Other possible applications for the present invention occur in a variety of domains. For example, sorting networks and Viterbi coding both access data in a stride permutation pattern. The techniques of the present invention can be used in streaming implementations of these applications.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments.

It is to be understood that the figures and descriptions of the embodiments have been simplified to illustrate elements that are relevant for a clear understanding of the embodiments, while eliminating, for purposes of clarity, other elements. For example, certain operating system details for computer system are not described herein. Those of ordinary skill in the art will recognize, however, that these and other elements may be desirable in a typical processor or computer system. Because such elements are well known in the art and because they do not facilitate a better understanding of the embodiments, a discussion of such elements is not provided herein.

In general, it will be apparent to one of ordinary skill in the art that at least some of the embodiments described herein may be implemented in many different embodiments of software, firmware and/or hardware. The software and firmware code may be executed by a processor or any other similar computing device. The software code or specialized control hardware, which may be used to implement embodiments, is not limiting. For example, embodiments described herein may be implemented in computer software using any suitable computer software language type, such as, for example, C or C++ using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary. A computer-readable medium may further include one or more data signals transmitted on one or more carrier waves.

A "computer," "computer system," "host," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented method for generating a synthesizable hardware description language file for a datapath for performing a permutation, the method comprising:

receiving, with a computer system, the permutation on $2^n$ data words, n>1, and a positive integer value k, $1 \leq k \leq n-1$, wherein the permutation is given by an invertible n×n bit matrix P, $2^k$ is the streaming width for the datapath, such that the datapath receives $2^k$ data words at regular intervals;

computing, with the computer system, n×n bit matrices N and M, wherein P=NM and rank($M_1$)=rank($N_1$')=k, wherein $M_1$ is the bottommost rightmost k×k submatrix of M and $N_1$' is the bottommost rightmost k×k submatrix of $N^{-1}$;

generating, with the computer system, one or more synthesizable hardware description language files for the datapath, wherein the datapath comprises a write-stage connection network, a plurality of memory banks connected to the write-stage connection network, and a read-stage connection network connected to the plurality of memory banks, wherein the write-stage connection network writes the $2^k$ data words received at every interval to the memory banks according to the matrix M, and wherein the read-stage connection network reads data words from the memory banks each interval according to the matrix N and wherein the datapath is capable of accepting the first $2^k$ datawords of the next $2^n$ datawords to be permuted in the interval immediately following accepting the last $2^k$ datawords of the preceding $2^n$ datawords; and storing the one or more synthesizable hardware description language files in a computer file.

2. The method of claim 1, further comprising synthesizing the one or more synthesizable hardware description language files to generate hardware for the datapath.

3. The method of claim 2, wherein the datapath comprises multiplexers and the memory banks.

4. The method of claim 3, wherein the datapath receives $2^k$ data words at every clock cycle.

5. The method of claim 4, wherein the memory banks comprise dual-ported RAM.

6. A computer system comprising:

a processor; and a memory in communication with the processor, wherein the memory stores instructions which, when executed by the processor, cause the processor to generate a synthesizable hardware description language file for a datapath for performing a permutation, wherein the permutation is on $2^n$ data words and is given by an invertible n×n bit matrix P, where $2^k$ is the streaming width for the datapath, such that the datapath receives $2^k$ data words at regular intervals, n>1 and $1 \leq k \leq n-1$, by:

computing n×n bit matrices N and M, wherein P=NM and rank($M_1$)=rank($N_1$')=k, wherein $M_1$ is the bottommost rightmost k×k submatrix of M and $N_1$' is the bottommost rightmost k×k submatrix of $N^{-1}$; and generating one or more synthesizable hardware description language files for the datapath, wherein the datapath comprises a write-stage connection network, a plurality of memory banks connected to the write-stage connection network, and a read-stage connection network connected to the plurality of memory banks, wherein the write-stage connection network writes the $2^k$ data words received at every interval to the memory banks according to the matrix M, and wherein the read-stage connection network reads data words from the memory banks each interval according to the matrix N, and wherein the datapath is capable of accepting the first $2^k$ datawords of the next $2^n$ datawords to be permuted in the interval immediately following accepting the last $2^k$ datawords of the preceding $2^n$ datawords.

7. The system of claim 6, wherein the datapath comprises multiplexers and the memory banks.

8. The system of claim 7, wherein the datapath is for receiving $2^k$ data words at every clock cycle.

9. The system of claim 8, wherein the memory banks comprise dual-ported RAM.

10. A non-transitory computer readable storage medium, having instructions stored thereon, which when executed by a processor, cause the processor to generate a synthesizable hardware description language file for a datapath for performing a permutation, wherein the permutation is on $2^n$ data words and is given by an invertible n×n bit matrix P, where $2^k$ is the streaming width for the datapath, such that the datapath receives $2^k$ data words at regular intervals, n>1 and $1 \leq k \leq n-1$, by by:

computing n×n bit matrices N and M, wherein P=NM and rank($M_1$)=rank($N_1$')=k, wherein $M_1$ is the bottommost rightmost k×k submatrix of M and $N_1$' is the bottommost rightmost k×k submatrix of $N^{-1}$; and generating one or more synthesizable hardware description language files for the datapath, wherein the datapath comprises a write-stage connection network, a plurality of memory banks connected to the write-stage connection network, and a read-stage connection network connected to the plurality of memory banks, wherein the write-stage connection network writes the $2^k$ data words received at every interval to the memory banks according to the matrix M, and wherein the read-stage connection network reads data words from the memory banks each interval according to the matrix N, and wherein the datapath is capable of accepting the first $2^k$ datawords of the next $2^n$ datawords to be permuted in the interval immediately following accepting the last $2^k$ datawords of the preceding $2^n$ datawords.

11. The non-transitory computer readable storage medium of claim 10, wherein the datapath comprises multiplexers and the memory banks.

12. The non-transitory computer readable storage medium of claim 11, wherein the datapath is for receiving $2^k$ data words at every clock cycle.

13. The non-transitory computer readable storage medium of claim 12, wherein the memory banks comprise dual-ported RAM.

14. A datapath for performing a fixed permutation on a vector of $2^n$ data words, n>1, wherein the permutation has the property that it can be specified as an n×n bit matrix P, the datapath comprising:

a plurality of databanks;

a write-state connection network connected to the plurality of databanks, wherein the write-stage connection network receives the $2^n$ data words in chunks of $2^k$ data words in $2^{n-k}$ regular intervals, $1 \leq k \leq n-1$; and a read-stage connection network connected to the plurality of databanks;

wherein N and M are n×n matrices such that P=NM and rank($M_1$)=rank($N_1$')=k, wherein $M_1$, is the bottommost rightmost k×k submatrix of M and $N_1$' is the bottommost rightmost k×k submatrix of $N^{-1}$; and wherein the write-stage connection network writes the $2^k$ data words received at every interval to the memory banks according to the matrix M;

wherein the read-stage connection network reads data words from the memory banks each interval according to the matrix N; and wherein the datapath is capable of accepting the first $2^k$ datawords of the next $2^n$ datawords to be permuted in the interval immediately following accepting the last $2^k$ datawords of the preceding $2^n$ datawords.

15. The datapath of claim 14, wherein P is a matrix that has at least one row with 2 entries equal to 1.

16. The datapath of claim 15, wherein k>1.

17. The datapath of claim 14, wherein P is a matrix that has exactly one entry 1 in every row and every column and that is zero elsewhere and P is not a cyclic shift and P is not a matrix with entries 1 only along the diagonal from top right to bottom left and zero elsewhere.

18. The datapath of claim 17, wherein k>1.

19. The datapath of claim 14 wherein P is a cyclic shift or P is a matrix with entries 1 only along the diagonal from top right to bottom left and zero elsewhere.

20. The datapath of claim 19 wherein k=2.

21. The datapath of claim 19 wherein k=3.

22. The datapath of claim 19 wherein k=4.

23. The datapath of claim 19 wherein k>4.

* * * * *